(12) United States Patent
Landis et al.

(10) Patent No.: US 11,792,836 B2
(45) Date of Patent: Oct. 17, 2023

(54) REPORTING CHANNEL STATISTICS FOR BEAM MANAGEMENT

(71) Applicant: QUALCOMM Incorporated, San Diego, CA (US)

(72) Inventors: Shay Landis, Hod Hasharon (IL); Assaf Touboul, Netanya (IL); Yehonatan Dallal, Kfar Saba (IL); Idan Michael Horn, Hod Hasharon (IL); Michael Levitsky, Rehovot (IL)

(73) Assignee: QUALCOMM Incorporated, San Diego, CA (US)

( * ) Notice: Subject to any disclaimer, the term of this patent is extended or adjusted under 35 U.S.C. 154(b) by 301 days.

(21) Appl. No.: 17/173,573

(22) Filed: Feb. 11, 2021

(65) Prior Publication Data

US 2021/0329656 A1    Oct. 21, 2021

Related U.S. Application Data

(60) Provisional application No. 63/011,128, filed on Apr. 16, 2020.

(51) Int. Cl.
*H04W 72/542* (2023.01)
*H04L 5/00* (2006.01)
(Continued)

(52) U.S. Cl.
CPC ......... *H04W 72/542* (2023.01); *H04L 5/0051* (2013.01); *H04W 72/044* (2013.01); *H04W 72/21* (2023.01)

(58) Field of Classification Search
CPC . H04W 72/542; H04W 72/044; H04W 72/21; H04L 5/0051; H04B 7/088; H04B 7/0695
See application file for complete search history.

(56) References Cited

U.S. PATENT DOCUMENTS

2013/0172002 A1\* 7/2013 Yu .................. H04B 7/068
455/452.1
2017/0338978 A1\* 11/2017 Monsen ............. H04L 25/025
(Continued)

FOREIGN PATENT DOCUMENTS

CN     108631891 A    10/2018
EP       3567744 A1    11/2019
(Continued)

OTHER PUBLICATIONS

International Search Report and Written Opinion—PCT/US2021/019706—ISA/EPO—dated Jun. 25, 2021.

*Primary Examiner* — Sharmin Chowdhury
(74) *Attorney, Agent, or Firm* — Holland & Hart LLP

(57) ABSTRACT

Methods, systems, and devices for wireless communications are described. In some systems, a user equipment (UE) may measure a received power of one or more reference signals, such as channel state information (CSI) reference signals (CSI-RSs) or synchronization signal blocks (SSBs), transmitted by a base station for a beam management procedure. The UE may determine a set of channel statistics associated with a channel used by the base station to transmit the one or more reference signals based on performing the beam management procedure. The UE may transmit a report to the base station, the report including at least an indication of the received of the one or more reference signals and the set of channel statistics. The base station may select a beam or a channel for communication with the UE based on at least the indication of the received power and the set of channel statistics.

30 Claims, 17 Drawing Sheets

(51) Int. Cl.
H04W 72/044 (2023.01)
H04W 72/21 (2023.01)

(56) References Cited

U.S. PATENT DOCUMENTS

| | | | | |
|---|---|---|---|---|
| 2018/0323845 | A1* | 11/2018 | Chang | H04B 7/0626 |
| 2019/0058510 | A1 | 2/2019 | Raghavan et al. | |
| 2019/0319682 | A1* | 10/2019 | Zhang | H04B 7/0626 |
| 2020/0014455 | A1* | 1/2020 | Gao | H04B 7/0626 |
| 2020/0021336 | A1* | 1/2020 | Da Silva | H04W 36/0094 |
| 2020/0228182 | A1* | 7/2020 | Nilsson | H04B 7/0647 |
| 2022/0286175 | A1* | 9/2022 | Matsumura | H04B 7/0695 |
| 2022/0330068 | A1* | 10/2022 | Yuan | H04B 7/063 |
| 2022/0394615 | A1* | 12/2022 | Maleki | H04B 17/102 |
| 2023/0007927 | A1* | 1/2023 | Papadopoulos | H04W 16/28 |

FOREIGN PATENT DOCUMENTS

| | | |
|---|---|---|
| WO | WO-2019022657 A1 | 1/2019 |
| WO | WO-2020006277 A1 | 1/2020 |

\* cited by examiner

REPORTING CHANNEL STATISTICS FOR BEAM MANAGEMENT

CROSS REFERENCE

The present Application for Patent claims the benefit of U.S. Provisional Patent Application No. 63/011,128 by LANDIS et al., entitled "REPORTING CHANNEL STATISTICS FOR BEAM MANAGEMENT," filed Apr. 16, 2020, assigned to the assignee hereof, and expressly incorporated by reference herein.

FIELD OF TECHNOLOGY

The following relates generally to wireless communications and more specifically to reporting channel statistics for beam management.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, a base station and a UE may communicate using one or more directional beams and may attempt to maintain a reliable communication link between the base station and the UE based on performing a beam management procedure.

SUMMARY

The described techniques relate to improved methods, systems, devices, and apparatuses that support reporting channel statistics for beam management. Generally, the described techniques provide for enhanced beam management procedures. To maintain a reliable communication link between a base station and a UE, the UE may measure a received power of one or more channel state information (CSI) reference signals (CSI-RSs) or synchronization signal blocks (SSBs) associated with a channel between the base station and the UE. Additionally, the UE may determine a set of channel statistics associated with the channel, such as a frequency selectivity, a time selectivity, a frequency correlation, or a time correlation, or any combination thereof. The UE may transmit a report to the base station including the measured received power and the set of channel statistics. Accordingly, the base station may select one or both of a beam and a channel for communication with the UE based on the measured received power and the set of channel statistics.

A method of wireless communication at a UE is described. The method may include measuring a received power of one or more reference signals for a beam management procedure, the one or more reference signals being associated with a channel, determining a set of channel statistics associated with the channel based on the beam management procedure, and transmitting, to a base station, a report including at least an indication of the received power and the set of channel statistics associated with the channel.

An apparatus for wireless communication at a UE is described. The apparatus may include a processor, memory coupled with the processor, and instructions stored in the memory. The instructions may be executable by the processor to cause the apparatus to measure a received power of one or more reference signals for a beam management procedure, the one or more reference signals being associated with a channel, determine a set of channel statistics associated with the channel based on the beam management procedure, and transmit, to a base station, a report including at least an indication of the received power and the set of channel statistics associated with the channel.

Another apparatus for wireless communication at a UE is described. The apparatus may include means for measuring a received power of one or more reference signals for a beam management procedure, the one or more reference signals being associated with a channel, determining a set of channel statistics associated with the channel based on the beam management procedure, and transmitting, to a base station, a report including at least an indication of the received power and the set of channel statistics associated with the channel.

A non-transitory computer-readable medium storing code for wireless communication at a UE is described. The code may include instructions executable by a processor to measure a received power of one or more reference signals for a beam management procedure, the one or more reference signals being associated with a channel, determine a set of channel statistics associated with the channel based on the beam management procedure, and transmit, to a base station, a report including at least an indication of the received power and the set of channel statistics associated with the channel.

In some examples of the method, apparatuses, and non-transitory computer-readable medium described herein, transmitting the report may include operations, features, means, or instructions for transmitting a first indication of the received power in a first field of the report and a second indication of the set of channel statistics in a second field of the report.

In some examples of the method, apparatuses, and non-transitory computer-readable medium described herein, transmitting the report may include operations, features, means, or instructions for determining a parameter that may be based on a combination of the received power and the set of channel statistics, and transmitting the report including the parameter.

In some examples of the method, apparatuses, and non-transitory computer-readable medium described herein, the parameter includes a difference from the received power based on the combination.

Some examples of the method, apparatuses, and non-transitory computer-readable medium described herein may further include operations, features, means, or instructions for determining a frequency selectivity associated with the channel, where the set of channel statistics includes the frequency selectivity.

Some examples of the method, apparatuses, and non-transitory computer-readable medium described herein may further include operations, features, means, or instructions for determining a time selectivity associated with the channel, where the set of channel statistics includes the time selectivity.

Some examples of the method, apparatuses, and non-transitory computer-readable medium described herein may further include operations, features, means, or instructions for determining one or both of a frequency correlation and a time correlation associated with the channel, where the set of channel statistics includes one or both of the frequency correlation and the time correlation.

Some examples of the method, apparatuses, and non-transitory computer-readable medium described herein may further include operations, features, means, or instructions for identifying a configuration for transmitting the report including at least the indication of the received power and the set of channel statistics, where determining the set of channel statistics may be based on the configuration.

In some examples of the method, apparatuses, and non-transitory computer-readable medium described herein, the configuration may be based on a capability of the UE.

Some examples of the method, apparatuses, and non-transitory computer-readable medium described herein may further include operations, features, means, or instructions for receiving an indication of the configuration from the base station.

In some examples of the method, apparatuses, and non-transitory computer-readable medium described herein, the configuration includes a pre-configuration of the UE.

Some examples of the method, apparatuses, and non-transitory computer-readable medium described herein may further include operations, features, means, or instructions for performing a channel equalization procedure based on the set of channel statistics.

Some examples of the method, apparatuses, and non-transitory computer-readable medium described herein may further include operations, features, means, or instructions for receiving, from the base station, an indication of a selected beam based on the indication of the received power and the set of channel statistics, and communicating with the base station using the selected beam.

Some examples of the method, apparatuses, and non-transitory computer-readable medium described herein may further include operations, features, means, or instructions for receiving, from the base station, an indication of a second channel based on the indication of the received power and the set of channel statistics, and communicating with the base station using the second channel.

In some examples of the method, apparatuses, and non-transitory computer-readable medium described herein, the report includes a number of bits based on the received power and the set of channel statistics.

A method of wireless communication at a base station is described. The method may include transmitting, to a UE, one or more reference signals for a beam management procedure, the one or more reference signals being associated with a first channel, receiving, from the UE, a report including at least an indication of a received power associated with the one or more reference signals and a set of channel statistics associated with the first channel based on the beam management procedure, and selecting one or both of a beam and a second channel for communication with the UE based on the indication of the received power and the set of channel statistics.

An apparatus for wireless communication at a base station is described. The apparatus may include a processor, memory coupled with the processor, and instructions stored in the memory. The instructions may be executable by the processor to cause the apparatus to transmit, to a UE, one or more reference signals for a beam management procedure, the one or more reference signals being associated with a first channel, receive, from the UE, a report including at least an indication of a received power associated with the one or more reference signals and a set of channel statistics associated with the first channel based on the beam management procedure, and select one or both of a beam and a second channel for communication with the UE based on the indication of the received power and the set of channel statistics.

Another apparatus for wireless communication at a base station is described. The apparatus may include means for transmitting, to a UE, one or more reference signals for a beam management procedure, the one or more reference signals being associated with a first channel, receiving, from the UE, a report including at least an indication of a received power associated with the one or more reference signals and a set of channel statistics associated with the first channel based on the beam management procedure, and selecting one or both of a beam and a second channel for communication with the UE based on the indication of the received power and the set of channel statistics.

A non-transitory computer-readable medium storing code for wireless communication at a base station is described. The code may include instructions executable by a processor to transmit, to a UE, one or more reference signals for a beam management procedure, the one or more reference signals being associated with a first channel, receive, from the UE, a report including at least an indication of a received power associated with the one or more reference signals and a set of channel statistics associated with the first channel based on the beam management procedure, and select one or both of a beam and a second channel for communication with the UE based on the indication of the received power and the set of channel statistics.

In some examples of the method, apparatuses, and non-transitory computer-readable medium described herein, receiving the report may include operations, features, means, or instructions for receiving a first indication of the received power in a first field of the report and a second indication of the set of channel statistics in a second field of the report.

In some examples of the method, apparatuses, and non-transitory computer-readable medium described herein, receiving the report may include operations, features, means, or instructions for receiving the report including a parameter that may be based on a combination of the received power and the set of channel statistics.

In some examples of the method, apparatuses, and non-transitory computer-readable medium described herein, the parameter includes a difference from the indication of the received power based on the combination.

In some examples of the method, apparatuses, and non-transitory computer-readable medium described herein, the set of channel statistics includes a frequency selectivity associated with the first channel.

In some examples of the method, apparatuses, and non-transitory computer-readable medium described herein, the set of channel statistics includes a time selectivity associated with the first channel.

In some examples of the method, apparatuses, and non-transitory computer-readable medium described herein, the set of channel statistics includes one or both of a frequency correlation and a time correlation associated with the first channel.

Some examples of the method, apparatuses, and non-transitory computer-readable medium described herein may further include operations, features, means, or instructions for transmitting, to the UE, an indication of a configuration, where the report including at least the indication of the received power and the set of channel statistics may be based on the configuration.

Some examples of the method, apparatuses, and non-transitory computer-readable medium described herein may further include operations, features, means, or instructions for transmitting, to the UE, an indication of the beam, and communicating with the UE using the beam.

Some examples of the method, apparatuses, and non-transitory computer-readable medium described herein may further include operations, features, means, or instructions for transmitting, to the UE, an indication of the second channel, and communicating with the UE using the second channel.

DETAILED DESCRIPTION

Figure 1:
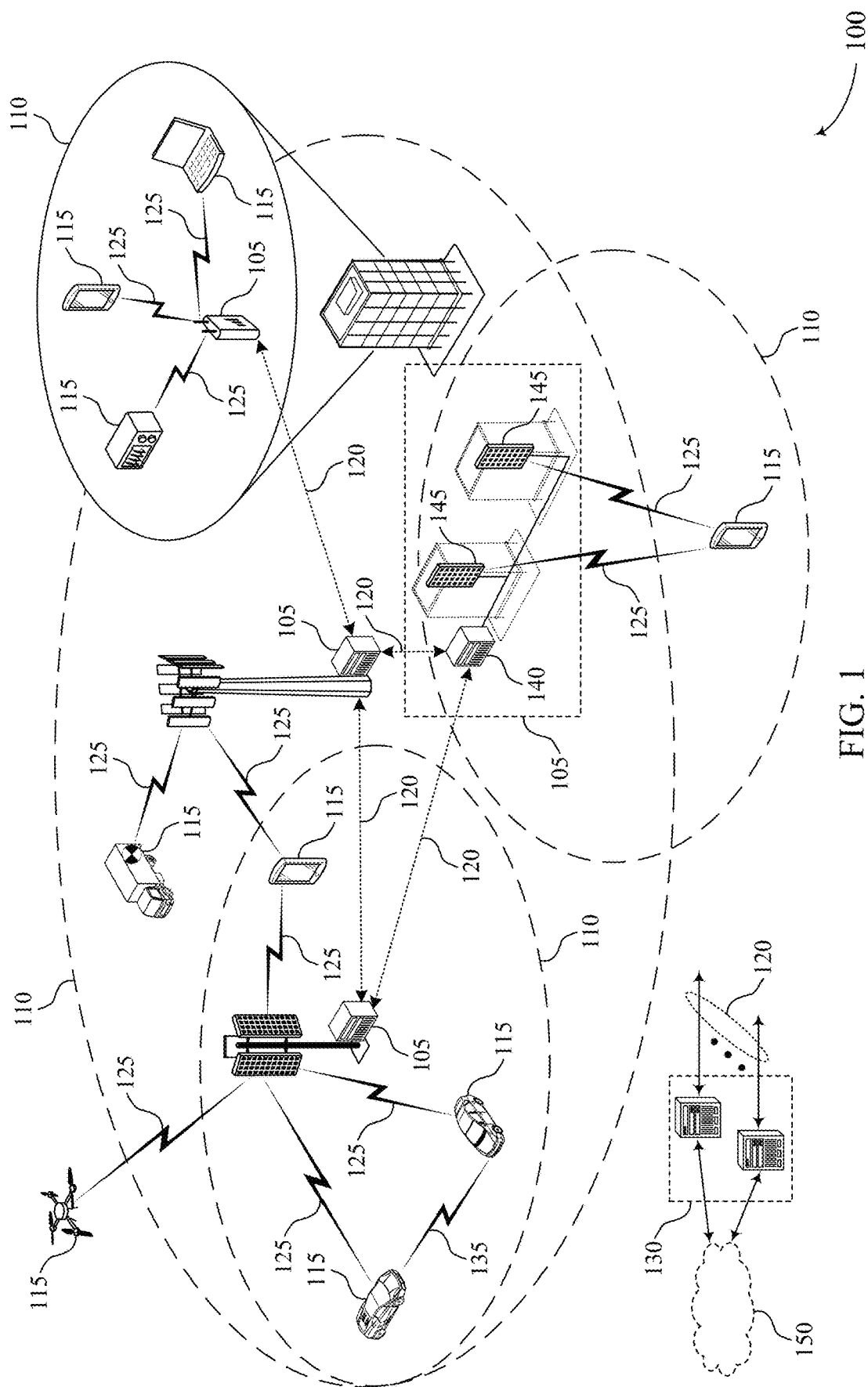
FIG. 1 illustrates an example of a wireless communications system that supports reporting channel statistics for beam management in accordance with aspects of the present disclosure.

In some wireless communications systems, a base station and a UE may attempt to maintain reliable communications over a communication link based on communicating using a beam or a channel that provides a sufficiently high signal strength for transmissions between the base station and the UE. In some cases, the base station and the UE may perform a number of beam management procedures to facilitate selection of an appropriate beam or channel. In such cases, the UE may receive one or more reference signals, such as CSI-RSs or SSBs, from the base station and measure a received power, such as a reference signal received power (RSRP), associated with the one or more reference signals. The UE may transmit a report to the base station including the measured RSRP and the base station may use the RSRP measurements to select a beam or a channel to use for communication with the UE. For example, each reference signal of the one or more reference signals transmitted by the base station may correspond to a beam or a channel and the base station may select a beam or a channel corresponding to the reference signal associated with the highest measured RSRP.

In some cases, however, the quality or performance of a beam or a channel may depend on other statistics or metrics in addition to the measured RSRP of a corresponding reference signal. In particular, different beams or channels may be associated with the same RSRP, but the beams or channels may have different channel qualities and different channel performances based on other statistics or metrics. In some cases, however, the base station may select a beam or a channel based solely or exclusively on RSRP (e.g., without accounting for other statistics or metrics associated with the beam or channel), which may result in a sub-optimal beam or channel selection because some beams or channels may have high RSRP but poor overall channel performance based on the other statistics or metrics associated with the channel. As such, based on excluding the other statistics or metrics when configuring a beam or channel for wireless communications, and solely relying on RSRP measurements, some beam management techniques may be deficient.

In some implementations of the present disclosure, the base station and the UE may support signaling of the additional channel statistics or metrics (e.g., information associated with a channel) during a beam management procedure and the base station may use the statistics or metrics to select a beam or a channel. For example, the UE may measure an RSRP of one or more reference signals, such as CSI-RSs or SSBs, associated with a channel between the base station and the UE, and the UE may additionally measure or otherwise determine a set of channel statistics or metrics associated with the channel. The UE may transmit, to the base station, a report including at least an indication of the RSRP of the one or more reference signals and the set of channel statistics or metrics associated with the channel. As such, the base station may receive the report including both the RSRP and the set of channel statistics or metrics and may use the set of channel statistics or metrics, along with the RSRP, to select a beam or a channel to use for communication with the UE.

Particular aspects of the subject matter described herein may be implemented to realize one or more potential advantages. For example, the described techniques may enable the base station to more optimally select a beam or a channel based on accounting for both an RSRP of one or more CSI-RSs or SSBs and a set of channel statistics that may influence the performance of the beam or the channel. In some examples, such techniques for a more optimal selection of a beam or a channel based on RSRP and other channel statistics may increase the likelihood for successful communication between the base station and the UE, which may result in higher data rates and greater overall system throughout and capacity. Further, by increasing the likelihood for successful communication between the base station and the UE, the base station and the UE may potentially perform retransmissions less frequently, which may reduce resource usage and likewise increase the spectral efficiency of communication between the base station and the UE.

Aspects of the disclosure are initially described in the context of wireless communications systems. Aspects of the disclosure are additionally described in the context of a process flow. Aspects of the disclosure are further illustrated by and described with reference to apparatus diagrams, system diagrams, and flowcharts that relate to reporting channel statistics for beam management.

FIG. 1 illustrates an example of a wireless communications system 100 that supports reporting channel statistics for beam management in accordance with aspects of the present disclosure. The wireless communications system 100 may include one or more base stations 105, one or more UEs 115, and a core network 130. In some examples, the wireless communications system 100 may be an LTE network, an LTE-A network, an LTE-A Pro network, or an NR network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a geographic coverage area 110 over which the UEs 115 and the base station 105 may establish one or more communication links 125. The geographic coverage area 110 may be an example of a geographic area over which a base station 105 and a UE 115 may support the communication of signals according to one or more radio access technologies.

The UEs 115 may be dispersed throughout a geographic coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. For example, the synchronization signals may include primary synchronization signals (PSS), secondary synchronization signals (SSS) or the like. In some cases, PSS, SSS, and/or broadcast information (e.g., a physical broadcast channel (PBCH)) may be transmitted within different SSBs (on respective directional beams), where one or more SSBs may be included within a synchronization signal burst or synchronization signal burst set. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or DFT-S-OFDM). In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, for example, in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beamforming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal, such as a CSI-RS or an SSB, according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105. In some aspects, for example, the base station 105 may transmit a CSI-RS or an SSB to a UE 115 as part of a beam management procedure.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a CSI-RS, or an SSB), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. Such signals may include SSBs or CSI-RSs. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions). In some aspects, for example, the UE 115 may receive an SSB or a CSI-RS as part of a beam management procedure.

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some implementations, the base station 105 and the UE 115 may maintain reliable communications via a communication link 125 based on performing a beam management procedure. In some examples, the base station 105 may transmit one or more CSI-RSs or SSBs associated with a channel to the UE 115 and the UE 115 may measure an RSRP (e.g., a received power) of the CSI-RSs or SSBs. Additionally, the UE 115 may determine a set of channel statistics associated with the channel based on performing the beam management procedure. In some implementations, the set of channel statistics may include a frequency selectivity of the channel, a time selectivity of the channel, a frequency correlation of the channel, a time correlation of the channel, or any combination thereof, among other examples. In some aspects, the UE 115 may determine the set of channel statistics to assist the base station 105 in selecting a beam or a channel for the beam management procedure.

The UE 115 may transmit a report to the base station 105 including at least an indication of the RSRP and the set of channel statistics associated with the channel. The base station 105 may receive the report and select a beam or a channel for communication with the UE based on the indication of the RSRP and the set of channel statistics. In some examples, the base station 105 may use the indication of the RSRP and the set of channel statistics to determine a beam or channel (e.g., a more optimal beam or a channel that may provide a greater likelihood for successful communication) than the base station 105 may otherwise determine based exclusively on RSRP. As such, the base station 105 may select a more optimal beam or channel and the base station 105 and the UE 115 may communicate over the selected beam or channel.

Figure 2:
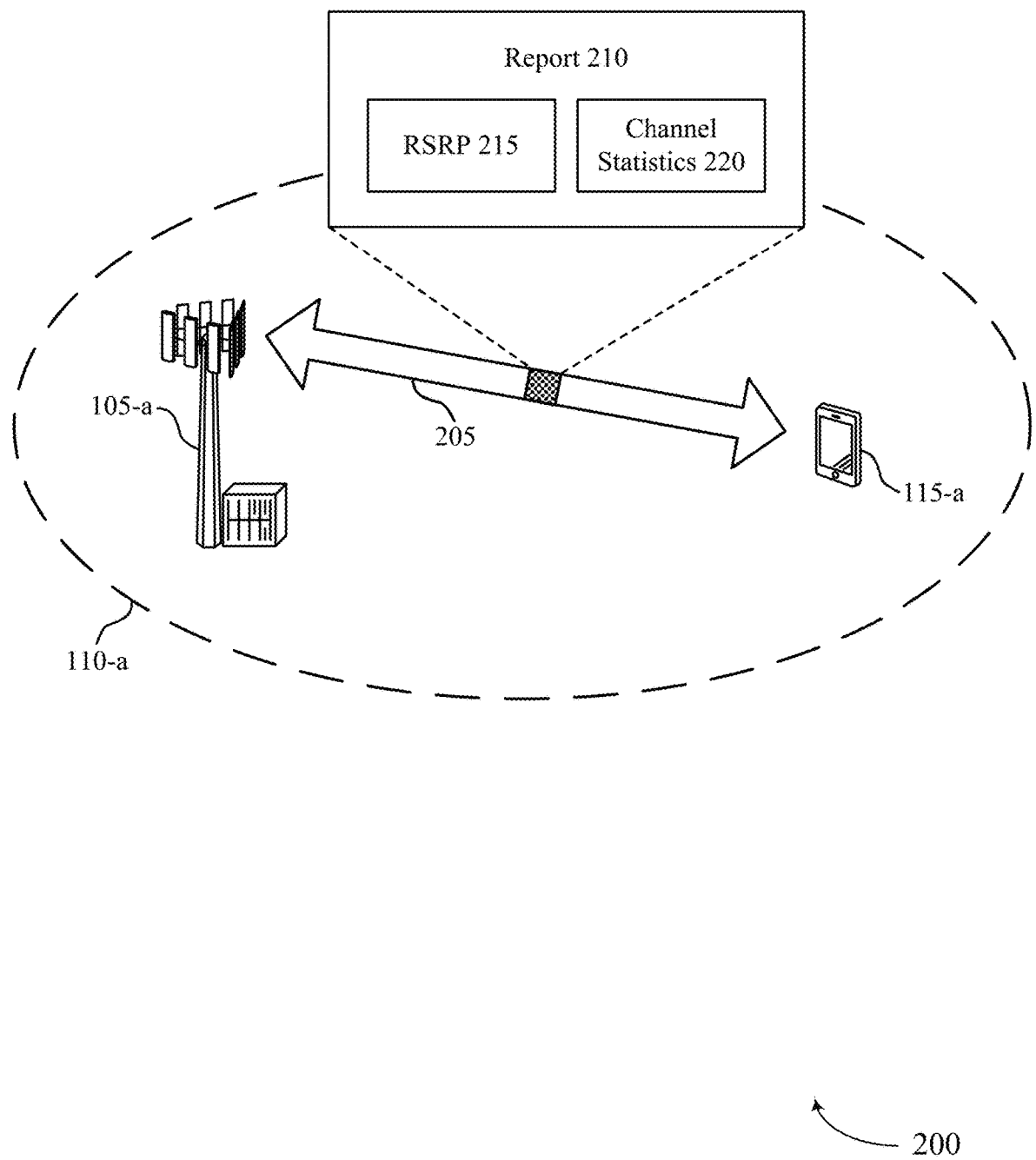
FIG. 2 illustrates an example of a wireless communications system that supports reporting channel statistics for beam management in accordance with aspects of the present disclosure.

FIG. 2 illustrates an example of a wireless communications system 200 that supports reporting channel statistics for beam management in accordance with aspects of the present disclosure. In some examples, the wireless communications system 200 may implement aspects of the wireless communications system 100. For example, the wireless communications system 200 may include a base station 105-a and a UE 115-a, which may be examples of corresponding devices as described herein, including with reference to FIG. 1. The base station 105-a and the UE 115-a may communicate over a communication link 205 within a geographic coverage area 110-a and, in some examples, the UE 115-a may transmit a report 210 including at least an indication of an RSRP 215 and a set of channel statistics 220 to the base station 105-a over the communication link 205.

In some cases, the base station 105-a and the UE 115-a may support directional transmissions and may communicate via one or more directional beams. For example, the base station 105-a and the UE 115-a may communicate via transmit beams or receive beams, or both, and may perform directional transmissions using a directional beam over the communication link 205. Further, the directional beams used by the base station 105-a and the UE 115-a may be associated with a channel or a medium between the base station 105-a and the UE 115-a. As such, the base station 105-a and the UE 115-a may communicate via the communication link 205 using one or more beams associated with one or more channels. In some aspects, the communication link 205 may be a line-of-sight link or involve a relatively small number of reflections (e.g., may be a non-line-of-sight link including one or more reflections).

In some cases, the radio environment between the base station 105-a and the UE 115-a may change, which may affect the quality of the beam or the channel, or both, used by the base station 105-a and the UE 115-a. For example, the UE 115-a may move (e.g., change physical location) or an object may become present between the base station 105-a and the UE 115-a, which may affect the signal strength or signal quality, or both, of transmissions over the communication link 205. Additionally, in some systems that support relatively higher frequency communication, such as NR systems operating in FR2 radio frequency spectrum bands, a change in the radio environment between the base station 105-a and the UE 115-a may have a more pronounced influence on the quality of the beam or the channel. Further, in such systems supporting relatively higher frequency communication, changes in the radio environment between the base station 105-a and the UE 115-a may result in sudden changes (e.g., small time-scale changes) in the quality of the beam or the channel used by the base station 105-a and the UE 115-a.

In some cases, such changes in the radio environment between the base station 105-a and the UE 115-a may decrease the reliability of the communication link 205 and, likewise, may decrease the likelihood for successful communication between the base station 105-a and the UE 115-a. Further, environmental changes affecting wireless signals transmitted between the UE 115-a and the base station 105-a may result in random constructive/destructive interference, multi-path propagation issues, fading, or the like. As an example, frequency selective fading may be characterized by various nulls or significant reduction in channel amplitude in a received signal across a set of resource elements. Thus, some resource elements, and some frequencies, may experience fading caused by external factors, such as reflections, interference, or the like.

To maintain reliable communications between the base station 105-a and the UE 115-a, the base station 105-a and the UE 115-a may perform one or more beam management procedures. In some cases, based on performing a beam management procedure, the base station 105-a may transmit one or more reference signals, such as CSI-RSs or SSBs, via one or more beams (e.g., each CSI-RS or SSB may be transmitted by the base station 105-a using a different directional beam) over a current channel between the base station 105-a and the UE 115-a. Accordingly, the UE 115-a may measure a received power (e.g., an RSRP 215) of the one or more reference signals associated with the channel. For example, the UE 115-a may receive a CSI-RS or an SSB over a set of resources (e.g., frequency resources, such as resource elements) and may measure the received power (e.g., a signal amplitude) of the CSI-RS or the SSB on each resource of the set of resources. In some cases, the UE 115-a may determine an RSRP 215 based on averaging the measured signal amplitudes of the CSI-RS or the SSB on each resource of the set of resources.

In some cases, the UE 115-a may transmit a report to the base station 105-a including the RSRP 215 associated with each CSI-RS or SSB and the base station 105-a, based on receiving the report, may select a beam or a channel for communication with the UE 115-a based on the measured RSRP 215 of the corresponding CSI-RS or SSB. For example, the base station 105-a may select a beam corresponding to the CSI-RS or the SSB that the UE 115-a measures as having the highest RSRP 215 (e.g., the CSI-RS or the SSB received by the UE 115-a with the greatest average signal strength or amplitude). As such, the base station 105-a may select a beam or a channel for communication with the UE 115-a (or refine a beam used for communication with the UE 115-a) based exclusively on the RSRP 215 of the one or more reference signals transmitted by the base station 105-a.

In some cases, however, the performance of a beam or a channel may be based on other channel statistics 220 or channel metrics in addition to the RSRP 215 measured by the UE 115-a. For example, the UE 115-a may measure a first channel and a second channel with a same or a similar RSRP 215, but the first channel and the second channel may nonetheless provide different channel performance (e.g., provide different likelihoods for successful communication). More specifically, the UE 115-a may measure a same or a similar RSRP 215 (e.g., an average signal amplitude over a set of resource elements) for the first channel and the second channel, but the signal amplitude of the first channel may be more consistent and reliable across the set of resource elements than the signal amplitude of the second channel. In other words, a graphed relationship between the set of resource elements and the signal amplitude (in dBs) of transmissions over the first channel may be more consistent and have fewer spikes, such as sudden drops in signal amplitude, than a graphed relationship between the set of resource elements and the signal amplitude (in dBs) of transmissions over the second channel.

In such examples, the first channel may be associated with a lower frequency selectivity (i.e., the first channel may be less frequency selective, or experience less frequency selective fading) than the second channel and, accordingly, the first channel may have smaller channel estimation losses or fewer channel estimation errors than the second channel. Further, the UE 115-*a* may communicate using the first channel with a lower rate of power consumption than the second channel based on the lesser frequency selectivity of the first channel than the second channel. Moreover, in some cases, the first channel may be associated with a channel time dispersity that is greater than a threshold size (e.g., greater than a cyclic prefix size or duration), which may reduce the effect of inter-symbol interference on transmissions over the first channel relative to the second channel.

As such, even though the UE 115-*a* may measure the same or similar RSRP 215 associated with the both of the first channel and the second channel, the first channel may be a more optimal channel based on the channel statistics 220 associated with the first channel. The base station 105-*a*, however, may be unaware of such channel statistics 220 and may select between the first channel and the second channel based exclusively on the RSRP 215. For instance, in the case that the second channel has a relatively greater RSRP 215 than the first channel, the base station 105-*a* may select the second channel for communications with the UE 115-*a*. As such, in some cases, the base station 105-*a* may select a sub-optimal channel without knowledge of the channel statistics 220 associated with the first channel or the second channel. Further, a beam or channel selection made exclusively on RSRP 215 may be especially sub-optimal in some systems, such as in NR systems, that are associated with a greater likelihood for sudden changes in the quality and reliability of a beam or a channel.

In some implementations of the present disclosure, the UE 115-*a* may measure an RSRP 215 of the one or more reference signals associated with a channel and may additionally measure or otherwise determine a set of channel statistics 220 associated with the channel. The set of channel statistics 220 may include a frequency selectivity, a time selectivity, a frequency correlation, a time correlation, a dispersity (e.g., a time dispersity), a Doppler spread, or any combination thereof, among other statistics or metrics that may influence the quality or performance of a beam or a channel. In some examples, the UE 115-*a* may measure or otherwise determine the set of channel statistics 220 to assist the base station 105-*a* in selecting a more optimal beam or channel (e.g., as compared to beam or channel selection based solely on the RSRP 215). As such, the UE 115-*a* may transmit a report 210 to the base station 105-*a* including at least an indication of the RSRP 215 (e.g., an integer value or a range of integer values) and the set of channel statistics 220.

In some examples, the report 210 may include the indication of the RSRP 215 and the set of channel statistics 220 in separate fields. For example, the indication of the RSRP 215 may be in a first field of the report 210 and the set of channel statistics 220 may be in a second field of the report 210. In some aspects, the report 210 may include the set of channel statistics 220 in a number of fields. For instance, the report 210 may include one field for frequency selectivity, another field for time selectivity, and so on. In some other examples, the UE 115-*a* may determine a parameter based on a combination of the indication of the RSRP 215 and the set of channel statistics 220. For example, the indication of the RSRP 215 and the set of channel statistics 220 may each correspond to a number or integer value or a bit value and the UE 115-*a* may calculate or otherwise determine a parameter (e.g., another number value or bit value) based on adding the value corresponding to the indication of the RSRP 215 and the value corresponding to the set of channel statistics 220. As such, the parameter may be based on the combination (e.g., a summation) of the indication of the RSRP 215 and the set of channel statistics 220. In some examples, the UE 115-*a* may subtract the determined parameter from one of the value corresponding to the indication of the RSRP 215 or the value corresponding to the set of channel statistics (e.g., to reduce a quantity of bits in the report 210) and may transmit an indication of the difference (e.g., a delta) to the base station 105-*a* via the report 210.

In some aspects, the UE 115-*a* may transmit the report 210 based on a configuration. In some examples, the configuration may be based on the capability of the UE 115-*a* and, as such, the UE 115-*a* may transmit an indication of the capability of the UE 115-*a* to the base station 105-*a*. In some implementations, the base station 105-*a* may transmit an indication of the configuration to the UE 115-*a*. In such implementations, the configuration may be configured at the UE 115-*a* via an RRC configuration or a MAC channel element (CE) configuration. In some other implementations, the configuration may be pre-configured at the UE 115-*a*. For example, the configuration that the UE 115-*a* uses to transmit the report 210 may be defined in a specification and pre-configured at the UE 115-*a*. As such, the UE 115-*a* may transmit the report 210 (either including separate fields for the indication of the RSRP 215 and the set of channel statistics 220 or including a parameter based on a combination of the indication of the RSRP 215 and the set of channel statistics 220) based on the configuration.

In implementations in which the base station 105-*a* receives the indication of the RSRP 215 and the set of channel statistics 220 in separate fields of the report 210, the base station 105-*a* may identify separate values corresponding to each of the indication of the RSRP 215 and the set of channel statistics 220 and may select a beam or a channel for communication with the UE 115-*a* based on the separate values of the indication of the RSRP 215 and the set of channel statistics 220. Alternatively, in implementations in which the base station 105-*a* receives the parameter based on the combination of the indication of the RSRP 215 and the set of channel statistics 220 in the report 210, the base station 105-*a* may select a beam or a channel based on the parameter (e.g., based on the summation of the indication of the RSRP 215 and the set of channel statistics 220). Alternatively, the base station 105-*a* may determine a value corresponding to the indication of the RSRP 215 and a separate value corresponding to the set of channel statistics 220 based on the parameter and may use the separate values of the indication of the RSRP 215 and the set of channel statistics 220 to select a beam or a channel for communication with the UE 115-*a*.

In either implementation, the base station 105-*a* may select a beam or a channel by accounting for at least the RSRP 215 and the set of channel statistics 220 measured or otherwise determined by the UE 115-*a* (e.g., based on the CSI-RSs or SSBs used for beam management). In some examples, the base station 105-*a* may select a beam based on the indication of the RSRP 215 and the set of channel statistics 220 and may transmit, to the UE 115-*a*, an indication of the selected beam. Accordingly, the base station 105-*a* and the UE 115-*a* may use the selected beam for communication. Additionally or alternatively, the base station 105-*a* may select a channel based on the indication of the RSRP 215 and the set of channel statistics 220 and may transmit, to the UE 115-*a*, an indication of the selected channel. Accordingly, the base station 105-*a* and the UE 115-*a* may use the selected channel for communication. In some aspects, the base station 105-*a* may select a beam or a channel associated with a low frequency selectivity or a low time selectivity, or both.

In some examples, the UE 115-*a* may perform an equalization procedure associated with the selected beam or channel. In some aspects, the UE 115-*a* may perform a relatively simpler equalization procedure based on performing an equalization procedure associated with a beam or a channel selected by the base station 105-*a* based on the set of channel statistics 220. As such, the UE 115-*a* may perform fewer or less power-intensive computations and, accordingly, may reduce the power consumption of the UE 115-*a* while performing the equalization procedure. Further, as described herein, the selection of a beam or a channel based on the RSRP 215 and the set of channel statistics 220 (e.g., the selection of a less frequency selective or less time selective beam or channel) may reduce channel estimation losses or channel estimation errors, which may increase the likelihood for successful communication between the base station 105-*a* and the UE 115-*a*.

Figure 3:
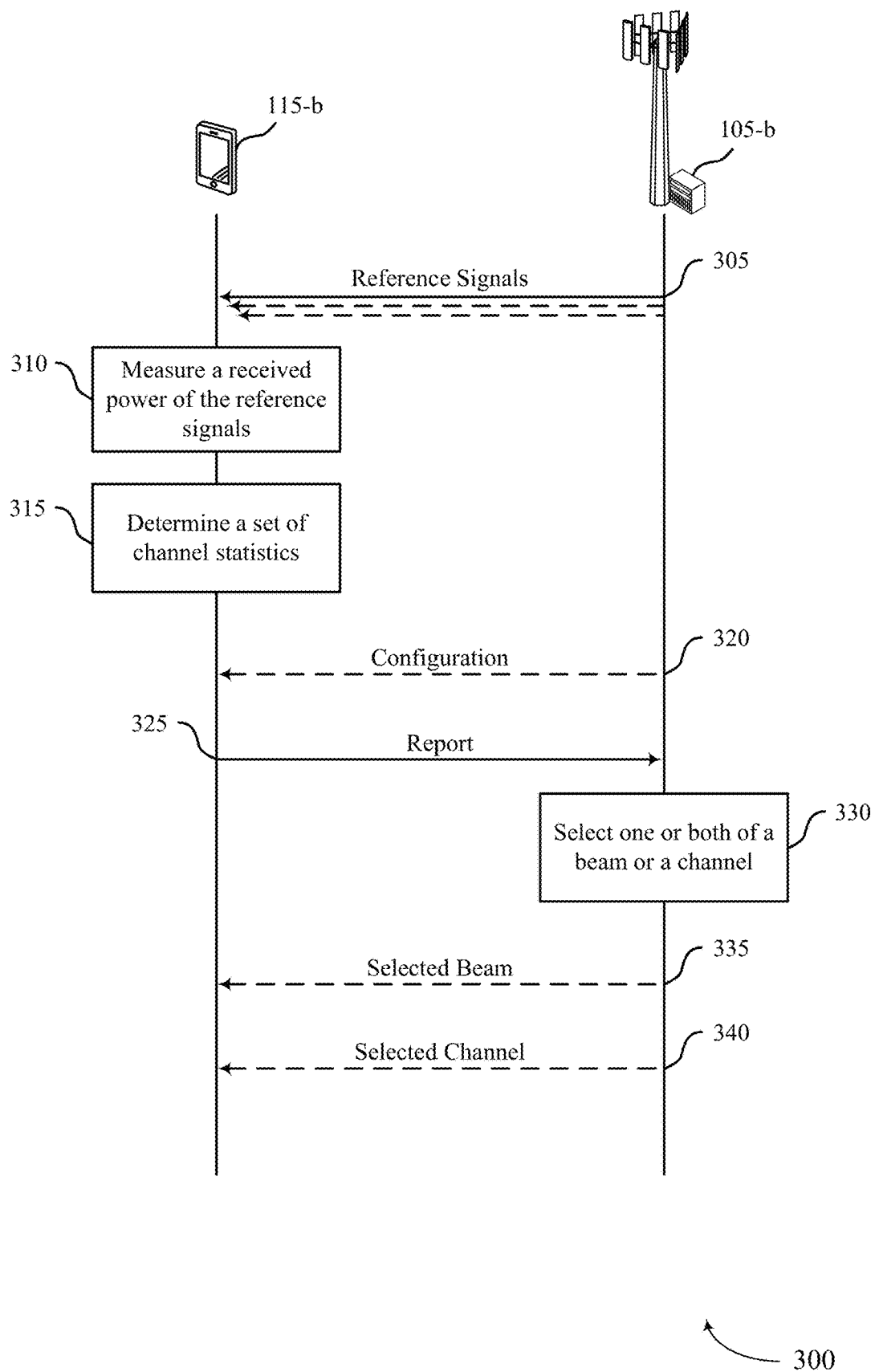
FIG. 3 illustrates an example of a process flow that supports reporting channel statistics for beam management in accordance with aspects of the present disclosure.

FIG. 3 illustrates an example of a process flow 300 that supports reporting channel statistics for beam management in accordance with aspects of the present disclosure. In some examples, the process flow 300 may implement or be implemented to realize aspects of the wireless communications system 100 or the wireless communications system 200. For example, the process flow 300 may illustrate communications between a base station 105-*b* and a UE 115-*b*, which may be examples of corresponding devices as described herein, including with reference to FIGS. 1 and 2. In some examples, the UE 115-*b* may transmit a report including an indication of an RSRP of one or more reference signals and a set of channel statistics associated with a channel to the base station 105-*b* as part of a beam management procedure.

At 305, the base station 105-*b* may transmit, to the UE 115-*b*, one or more reference signals, such as CSI-RSs or SSBs, for or as part of a beam management procedure. The one or more CSI-RSs or SSBs may be associated with a first channel (e.g., an initial or current channel over which the base station 105-*b* and the UE 115-*b* communicate). In some cases, the base station 105-*b* may transmit each of the one or more CSI-RSs using a different directional beam.

At 310, the UE 115-*b* may measure a received power (e.g., an RSRP) of the one or more reference signals for the beam management procedure. In some cases, the base station 105-*b* may transmit each reference signal (e.g., each CSI-RS or SSB) using a different directional beam and the received power measured by the UE 115-*a* of the one or more reference signals may be based on the direction of the beam, the location of the UE 115-*b*, the presence of an object between the base station 105-*b* and the UE 115-*b*, or any combination thereof.

At 315, the UE 115-*b* may determine a set of channel statistics associated with the channel based on the beam management procedure. In some examples, the set of channel statistics may include any statistics or metrics associated with the channel that may affect or influence the performance of the channel or a beam. For example, the set of channel statistics may include a frequency selectivity, a time selectivity, a frequency correlation, a time correlation, or any combination thereof, as described herein, including with reference to FIG. 2.

At 320, the base station 105-*b* may, in some implementations, transmit, to the UE 115-*b*, an indication of a configuration. In some aspects, the configuration may be based on the capability of the UE 115-*b*. In some examples, a report including at least an indication of the received power and the set of channel statistics is based on the configuration. For example, the UE 115-*b* may receive the configuration from the base station 105-*b* and may determine whether to include both of the indication of the received power and the set of channel statistics in the report, which channel statistics to include in the report, or how to include the indication of the received power and the set of channel statistics in the report based on the configuration. For example, the UE 115-*b* may determine, based on the configuration, a number of fields to include in the report, whether to include the indication of the received power and the set of channel statistics in separate fields, or whether to include the indication of the received power and the set of channel statistics in one field (e.g., as a single parameter equal to a combination of the indication of the received power and the set of channel statistics or equal to a delta relative to one of the received power or the set of channel statistics). In some other implementations, the base station 105-*b* may refrain from transmitting the indication of the configuration to the UE 115-*b*. In such implementations, the configuration may be a pre-configuration of the UE 115-*b*.

At 325, the UE 115-*b* may transmit, to the base station 105-*b*, a report including at least the indication of the received power and the set of channel statistics associated with the channel. In some examples, the UE 115-*b* may transmit the report based on the configuration of the UE 115-*b*, which may be received at 320 or pre-configured at the UE 115-*b*.

At 330, the base station 105-*b* select one or both of a beam and a second channel for communication (e.g., subsequent communication) with the UE 115-*b* based on the indication of the received power and the set of channel statistics. As such, the base station 105-*b* may more optimally select a beam or a channel associated with a greater performance. In other words, the base station 105-*b* may select a beam or a channel that may result in a greater likelihood for successful communication between the base station 105-*b* and the UE 115-*b* than a beam or a channel that the base station 105-*b* may have selected based exclusively on RSRP. In some examples, the base station 105-*b* may select a beam or a channel based on an optimization (e.g., an optimization algorithm) between a high received power and a low frequency or time selectivity. For instance, such an optimization algorithm may include received power, frequency selectivity, or time selectivity, or a combination thereof, as inputs and may be executed to select a beam or a channel based on the inputs (and, in some cases, weightings applied to each of the inputs). Accordingly, the base station 105-*b* may select a beam or a channel associated with low channel estimation losses or channel estimation errors and high performance.

At 335, the base station 105-*b* may, in some implementations, transmit, to the UE 115-*b*, an indication of the selected beam. At 340, the base station 105-*b* may, in some additional or alternative implementations, transmit, to the UE 115-*b*, an indication of the selected channel (e.g., a second channel). In either implementation, the base station 105-*b* and the UE 115-*b* may communicate using the selected beam or channel. In some examples, the beam or channel that was selected based on the received power and the set of channel statistics may be used by the base station 105-*b* and the UE 115-*b* to increase an achievable system throughput or data rate, among other benefits as described herein.

Figure 4:
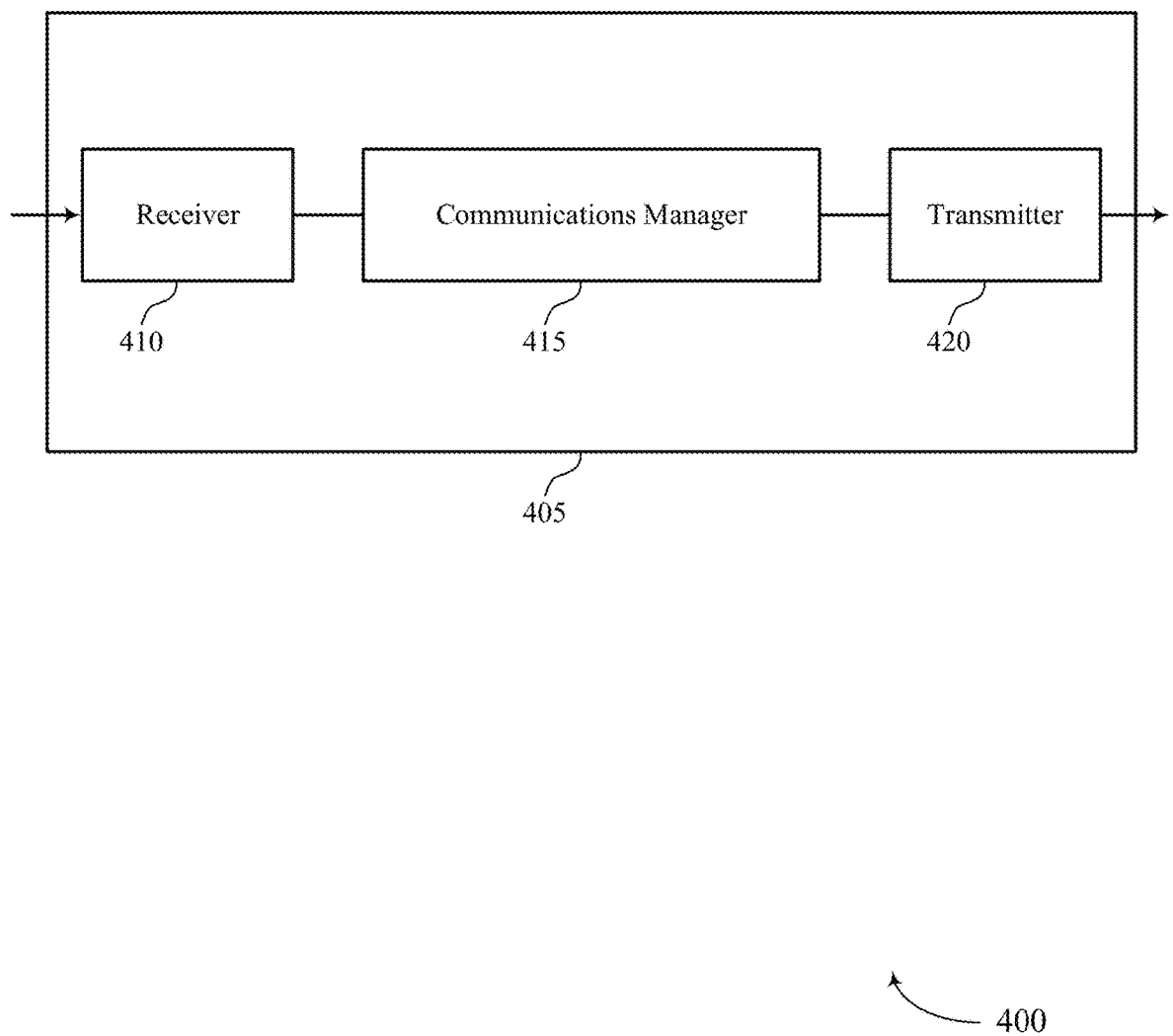
FIGS. 4 and 5 show diagrams of devices that support reporting channel statistics for beam management in accordance with aspects of the present disclosure.

FIG. 4 shows a diagram 400 of a device 405 that supports reporting channel statistics for beam management in accordance with aspects of the present disclosure. The device 405 may be an example of aspects of a UE 115 as described herein. The device 405 may include a receiver 410, a communications manager 415, and a transmitter 420. The device 405 may also include a processor. Each of these components may be in communication with one another (e.g., via one or more buses).

The receiver 410 may receive information such as packets, user data, or control information associated with various information channels (e.g., control channels, data channels, and information related to reporting channel statistics for beam management, etc.). Information may be passed on to other components of the device 405. The receiver 410 may be an example of aspects of the transceiver 720 described with reference to FIG. 7. The receiver 410 may utilize a single antenna or a set of antennas.

The communications manager 415 may measure a received power of one or more reference signals for a beam management procedure, the one or more reference signals being associated with a channel, determine a set of channel statistics associated with the channel based on the beam management procedure, and transmit, to a base station, a report including at least an indication of the received power and the set of channel statistics associated with the channel. The communications manager 415 may be an example of aspects of the communications manager 710 described herein.

The communications manager 415, or its sub-components, may be implemented in hardware, code (e.g., software or firmware) executed by a processor, or any combination thereof. If implemented in code executed by a processor, the functions of the communications manager 415, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 415, or its sub-components, may be physically located at various positions, including being distributed such that portions of functions are implemented at different physical locations by one or more physical components. In some examples, the communications manager 415, or its sub-components, may be a separate and distinct component in accordance with various aspects of the present disclosure. In some examples, the communications manager 415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 420 may transmit signals generated by other components of the device 405. In some examples, the transmitter 420 may be collocated with a receiver 410 in a transceiver module. For example, the transmitter 420 may be an example of aspects of the transceiver 720 described with reference to FIG. 7. The transmitter 420 may utilize a single antenna or a set of antennas.

In some examples, the communications manager 415 may be implemented as an integrated circuit or chipset for a mobile device modem, and the receiver 410 and the transmitter 420 may be implemented as analog components (e.g., amplifiers, filters, antennas) coupled with the mobile device modem to enable wireless transmission and reception over one or more bands.

The communications manager 415 as described herein may be implemented to realize one or more potential advantages. In some implementations of the present disclosure, the communications manager 415 may achieve a greater throughput based on communicating with a base station 105 using a beam or a channel that was selected based on a received power and a set of channel statistics associated with the channel. Likewise, the device 405 may communicate with the base station 105 at a higher data rate, which may reduce the amount of time that one or more processing units of the device 405 spend transmitting or monitoring for transmissions from the base station 105. By reducing the amount of time that the one or more processing units of the device 405 spend transmitting or monitoring for transmissions, the one or more processing units may spend longer durations in a sleep mode and likewise conserve battery power, potentially increasing the battery life of the device 405.

Further, the communications manager 415 may perform simpler channel equalization procedures for channel selected based on the set of channel statistics (e.g., for channels that are less frequency selective or less time selective). As such, one or more processing units of the device 405 may reduce the computation complexity of the channel equalization procedures, which may further reduce the power consumed by the device 405 during channel equalization and may likewise further increase the battery life of the device 405.

Figure 5:
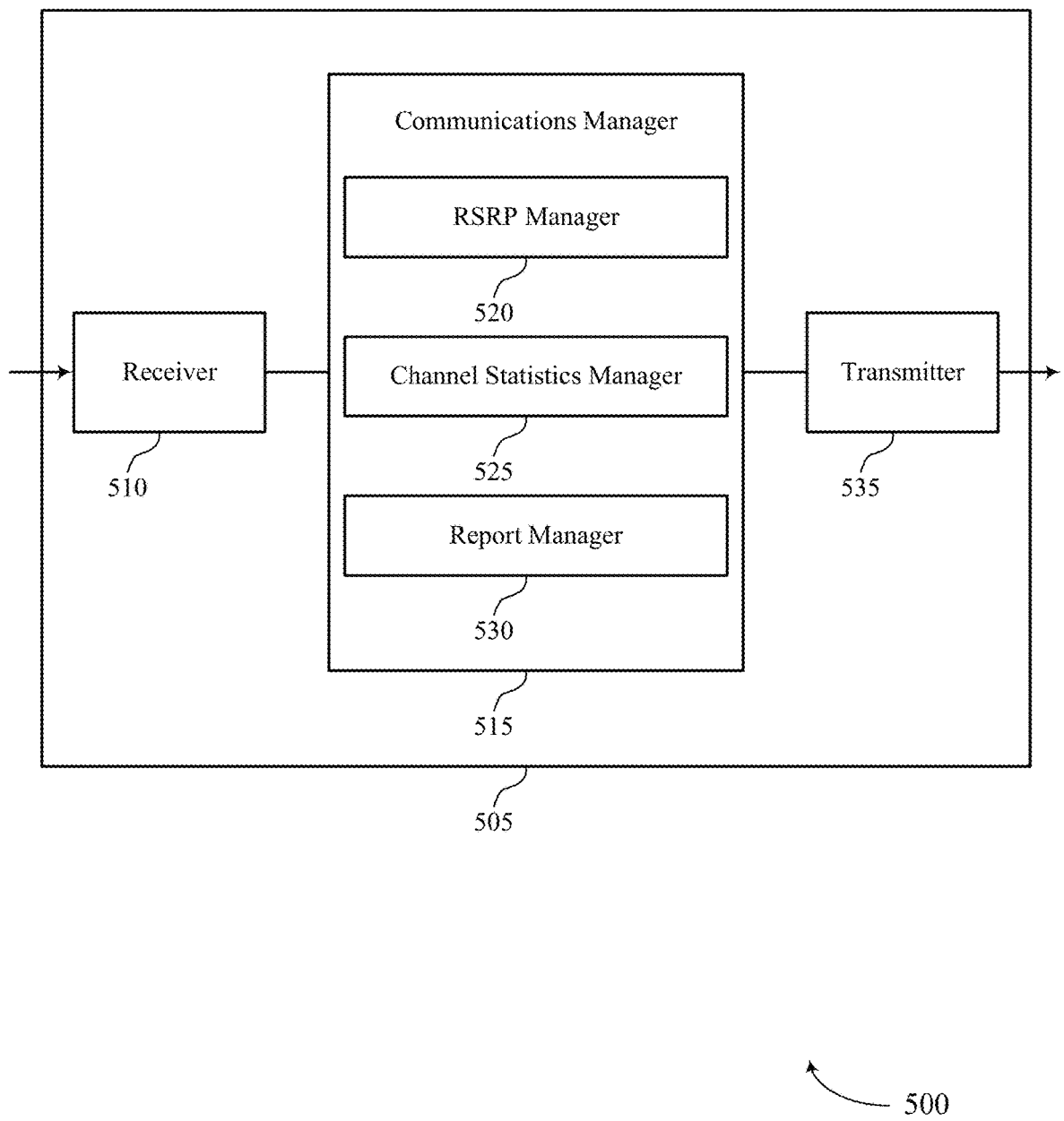

FIG. 5 shows a diagram 500 of a device 505 that supports reporting channel statistics for beam management in accordance with aspects of the present disclosure. The device 505 may be an example of aspects of a device 405, or a UE 115 as described herein. The device 505 may include a receiver 510, a communications manager 515, and a transmitter 535. The device 505 may also include a processor. Each of these components may be in communication with one another (e.g., via one or more buses).

The receiver 510 may receive information such as packets, user data, or control information associated with various information channels (e.g., control channels, data channels, and information related to reporting channel statistics for beam management, etc.). Information may be passed on to other components of the device 505. The receiver 510 may be an example of aspects of the transceiver 720 described with reference to FIG. 7. The receiver 510 may utilize a single antenna or a set of antennas.

The communications manager 515 may be an example of aspects of the communications manager 415 as described herein. The communications manager 515 may include an RSRP manager 520, a channel statistics manager 525, and a report manager 530. The communications manager 515 may be an example of aspects of the communications manager 710 described herein.

The RSRP manager 520 may measure a received power of one or more reference signals for a beam management procedure, the one or more reference signals being associated with a channel. The channel statistics manager 525 may determine a set of channel statistics associated with the channel based on the beam management procedure. The report manager 530 may transmit, to a base station, a report including at least an indication of the received power and the set of channel statistics associated with the channel.

The transmitter 535 may transmit signals generated by other components of the device 505. In some examples, the transmitter 535 may be collocated with a receiver 510 in a transceiver module. For example, the transmitter 535 may be an example of aspects of the transceiver 720 described with reference to FIG. 7. The transmitter 535 may utilize a single antenna or a set of antennas.

Figure 6:
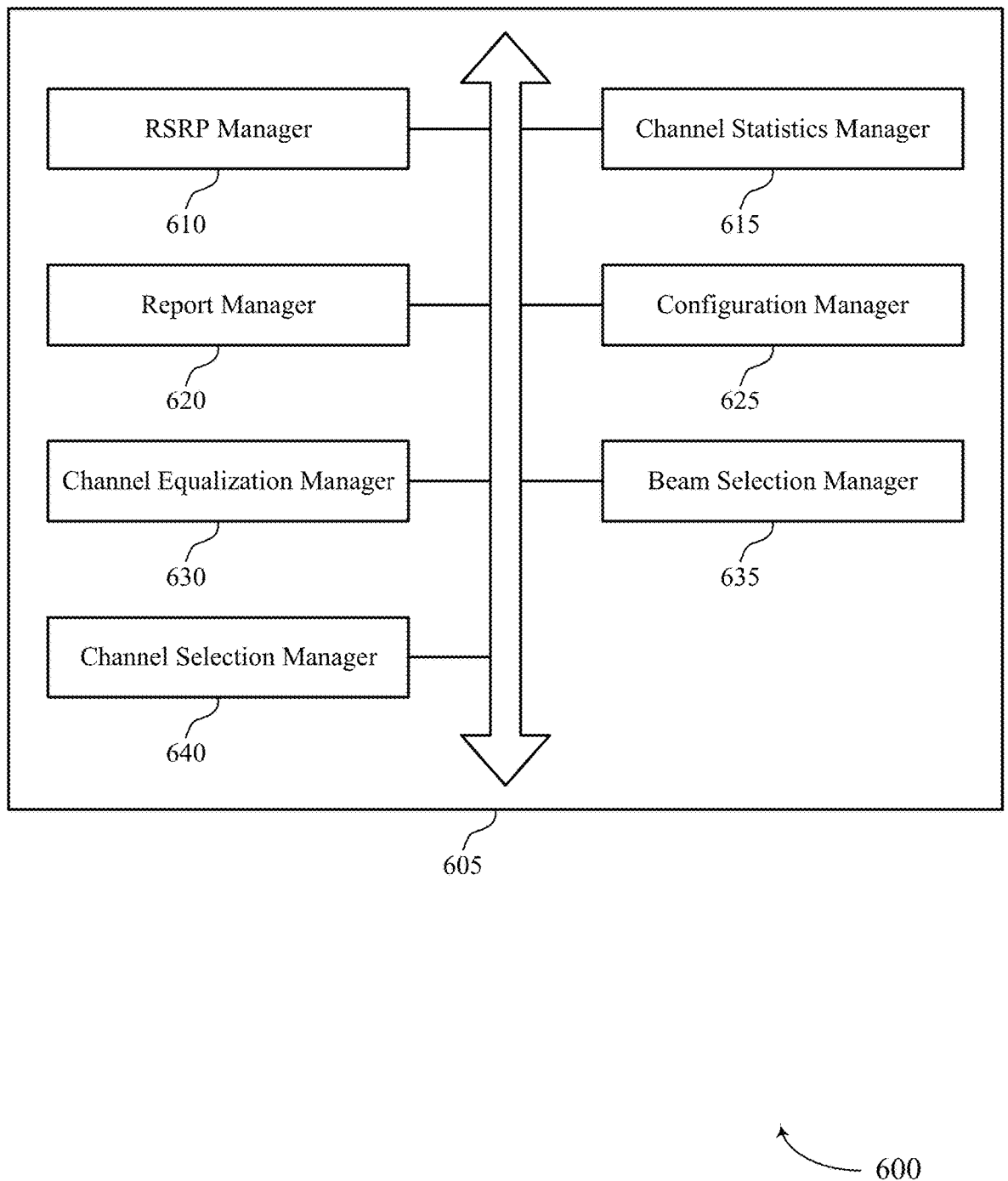
FIG. 6 shows a diagram of a communications manager that supports reporting channel statistics for beam management in accordance with aspects of the present disclosure.

FIG. 6 shows a diagram 600 of a communications manager 605 that supports reporting channel statistics for beam management in accordance with aspects of the present disclosure. The communications manager 605 may be an example of aspects of a communications manager 415, a communications manager 515, or a communications manager 710 described herein. The communications manager 605 may include an RSRP manager 610, a channel statistics manager 615, a report manager 620, a configuration manager 625, a channel equalization manager 630, a beam selection manager 635, and a channel selection manager 640. Each of these modules may communicate, directly or indirectly, with one another (e.g., via one or more buses).

The RSRP manager 610 may measure a received power of one or more reference signals for a beam management procedure, the one or more reference signals being associated with a channel.

The channel statistics manager 615 may determine a set of channel statistics associated with the channel based on the beam management procedure. In some examples, determining a frequency selectivity associated with the channel, where the set of channel statistics includes the determined frequency selectivity. In some examples, determining a time selectivity associated with the channel, where the set of channel statistics includes the determined time selectivity. In some examples, determining one or both of a frequency correlation and a time correlation associated with the channel, where the set of channel statistics includes one or both of the frequency correlation and the time correlation.

The report manager 620 may transmit, to a base station, a report including at least an indication of the received power and the set of channel statistics associated with the channel. In some examples, the report manager 620 may transmit a first indication of the received power in a first field of the report and a second indication of the set of channel statistics in a second field of the report. In some examples, the report manager 620 may determine a parameter that is based on a combination of the received power and the set of channel statistics.

In some examples, the report manager 620 may transmit the report including the determined parameter. In some cases, the parameter includes a difference from the received power based on the combination. In some cases, the report includes a number of bits based on the received power and the set of channel statistics.

The configuration manager 625 may identify a configuration for transmitting the report including at least the indication of the received power and the set of channel statistics, where determining the set of channel statistics is based on the configuration. In some examples, the configuration manager 625 may receive an indication of the configuration from the base station. In some cases, the configuration is based on a capability of the UE. In some cases, the configuration includes a pre-configuration of the UE.

The channel equalization manager 630 may perform a channel equalization procedure based on the determined set of channel statistics.

The beam selection manager 635 may receive, from the base station, an indication of a selected beam based on the indication of the received power and the set of channel statistics. In some examples, the beam selection manager 635 may communicate with the base station using the selected beam.

The channel selection manager 640 may receive, from the base station, an indication of a second channel based on the indication of the received power and the set of channel statistics. In some examples, the channel selection manager 640 may communicate with the base station using the second channel.

Figure 7:
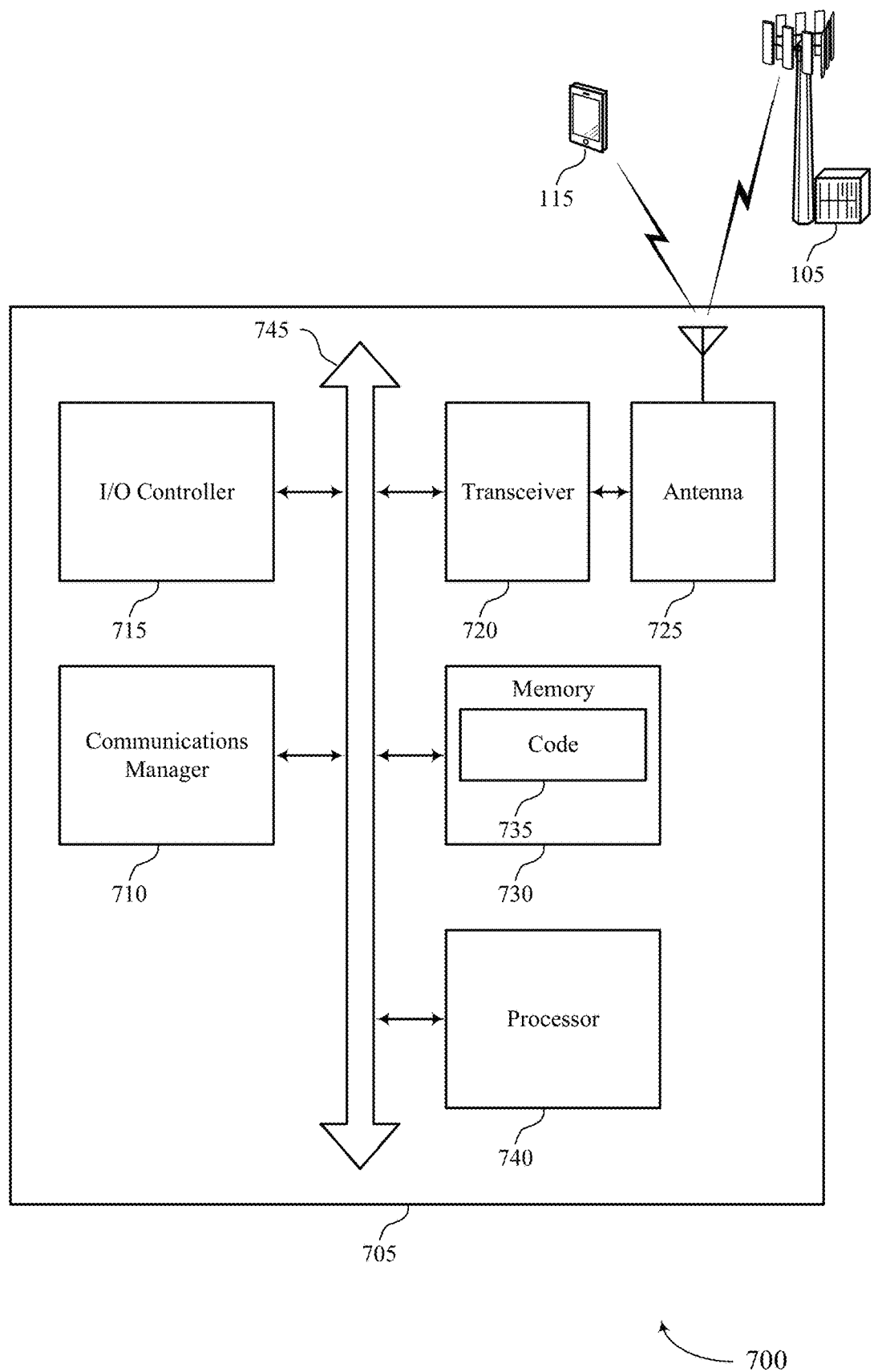
FIG. 7 shows a diagram of a system including a device that supports reporting channel statistics for beam management in accordance with aspects of the present disclosure.

FIG. 7 shows a diagram of a system 700 including a device 705 that supports reporting channel statistics for beam management in accordance with aspects of the present disclosure. The device 705 may be an example of or include the components of device 405, device 505, or a UE 115 as described herein. The device 705 may include components for bi-directional voice and data communications including components for transmitting and receiving communications, including a communications manager 710, an I/O controller 715, a transceiver 720, an antenna 725, memory 730, and a processor 740. These components may be in electronic communication via one or more buses (e.g., bus 745).

The communications manager 710 may measure a received power of one or more reference signals for a beam management procedure, the one or more reference signals being associated with a channel, determine a set of channel statistics associated with the channel based on the beam management procedure, and transmit, to a base station, a report including at least an indication of the received power and the set of channel statistics associated with the channel.

The I/O controller 715 may manage input and output signals for the device 705. The I/O controller 715 may also manage peripherals not integrated into the device 705. In some cases, the I/O controller 715 may represent a physical connection or port to an external peripheral. In some cases, the I/O controller 715 may utilize an operating system such as iOS®, ANDROID®, MS-DOS®, MS-WINDOWS®, OS/2®, UNIX®, LINUX®, or another known operating system. In other cases, the I/O controller 715 may represent or interact with a modem, a keyboard, a mouse, a touchscreen, or a similar device. In some cases, the I/O controller 715 may be implemented as part of a processor. In some cases, a user may interact with the device 705 via the I/O controller 715 or via hardware components controlled by the I/O controller 715.

The transceiver 720 may communicate bi-directionally, via one or more antennas, wired, or wireless links as described herein. For example, the transceiver 720 may represent a wireless transceiver and may communicate bi-directionally with another wireless transceiver. The transceiver 720 may also include a modem to modulate the packets and provide the modulated packets to the antennas for transmission, and to demodulate packets received from the antennas.

In some cases, the wireless device may include a single antenna 725. However, in some cases the device may have more than one antenna 725, which may be capable of concurrently transmitting or receiving multiple wireless transmissions.

The memory 730 may include random-access memory (RAM) and read-only memory (ROM). The memory 730 may store computer-readable, computer-executable code 735 including instructions that, when executed, cause the processor to perform various functions described herein. In some cases, the memory 730 may contain, among other things, a basic I/O system (BIOS) which may control basic hardware or software operation such as the interaction with peripheral components or devices.

The processor 740 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 740 may be configured to operate a memory array using a memory controller. In other cases, a memory controller may be integrated into the processor 740. The processor 740 may be configured to execute computer-readable instructions stored in a memory (e.g., the memory 730) to cause the device 705 to perform various functions (e.g., functions or tasks supporting reporting channel statistics for beam management).

The code 735 may include instructions to implement aspects of the present disclosure, including instructions to support wireless communications. The code 735 may be stored in a non-transitory computer-readable medium such as system memory or other type of memory. In some cases, the code 735 may not be directly executable by the processor 740 but may cause a computer (e.g., when compiled and executed) to perform functions described herein.

Figure 8:
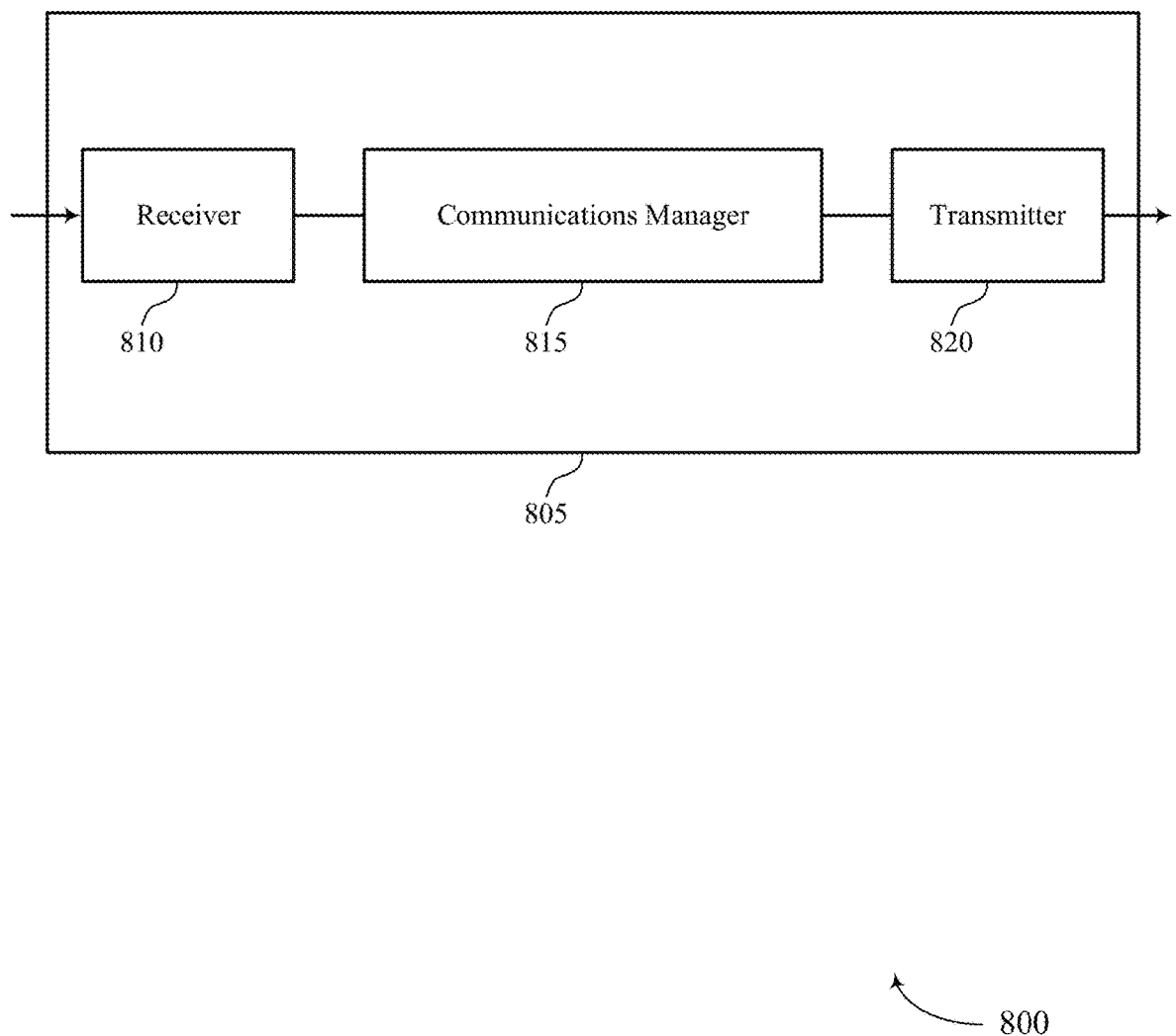
FIGS. 8 and 9 show diagrams of devices that support reporting channel statistics for beam management in accordance with aspects of the present disclosure.

FIG. 8 shows a diagram 800 of a device 805 that supports reporting channel statistics for beam management in accordance with aspects of the present disclosure. The device 805 may be an example of aspects of a base station 105 as described herein. The device 805 may include a receiver 810, a communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to reporting channel statistics for beam management, etc.). Information may be passed on to other components of the device 805. The receiver 810 may be an example of aspects of the transceiver 1120 described with reference to FIG. 11. The receiver 810 may utilize a single antenna or a set of antennas.

The communications manager 815 may transmit, to a UE, one or more reference signals for a beam management procedure, the one or more reference signals being associated with a first channel, receive, from the UE, a report including at least an indication of a received power associated with the one or more reference signals and a set of channel statistics associated with the first channel based on the beam management procedure, and select one or both of a beam and a second channel for communication with the UE based on the indication of the received power and the set of channel statistics. The communications manager 815 may be an example of aspects of the communications manager 1110 described herein.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

As described herein, the device 805 may select a beam or a channel based at least on an indication of a received power and a set of channel statistics. The device 805, by accounting for at least the indication of the received power and the set of channel statistics, may select a beam or a channel associated with a higher performance than if the device 805 selected a beam or a channel based exclusively on the received power. By selecting a beam or a channel with higher performance, the device 805 may communicate more information with a UE 115, which may increase system throughput and support efficient resource usage between the device 805 and the UE 115, which may enable the device 805 to allocate more resources to other devices in the system. Further, based on communicating over a beam or a channel associated with a high performance, the device 805 may transmit less control signaling to the UE 115. As such, the device 805 may reduce signaling overhead between the device 805 and the UE 115 and, accordingly, reduce the levels of interference in the system.

Figure 9:
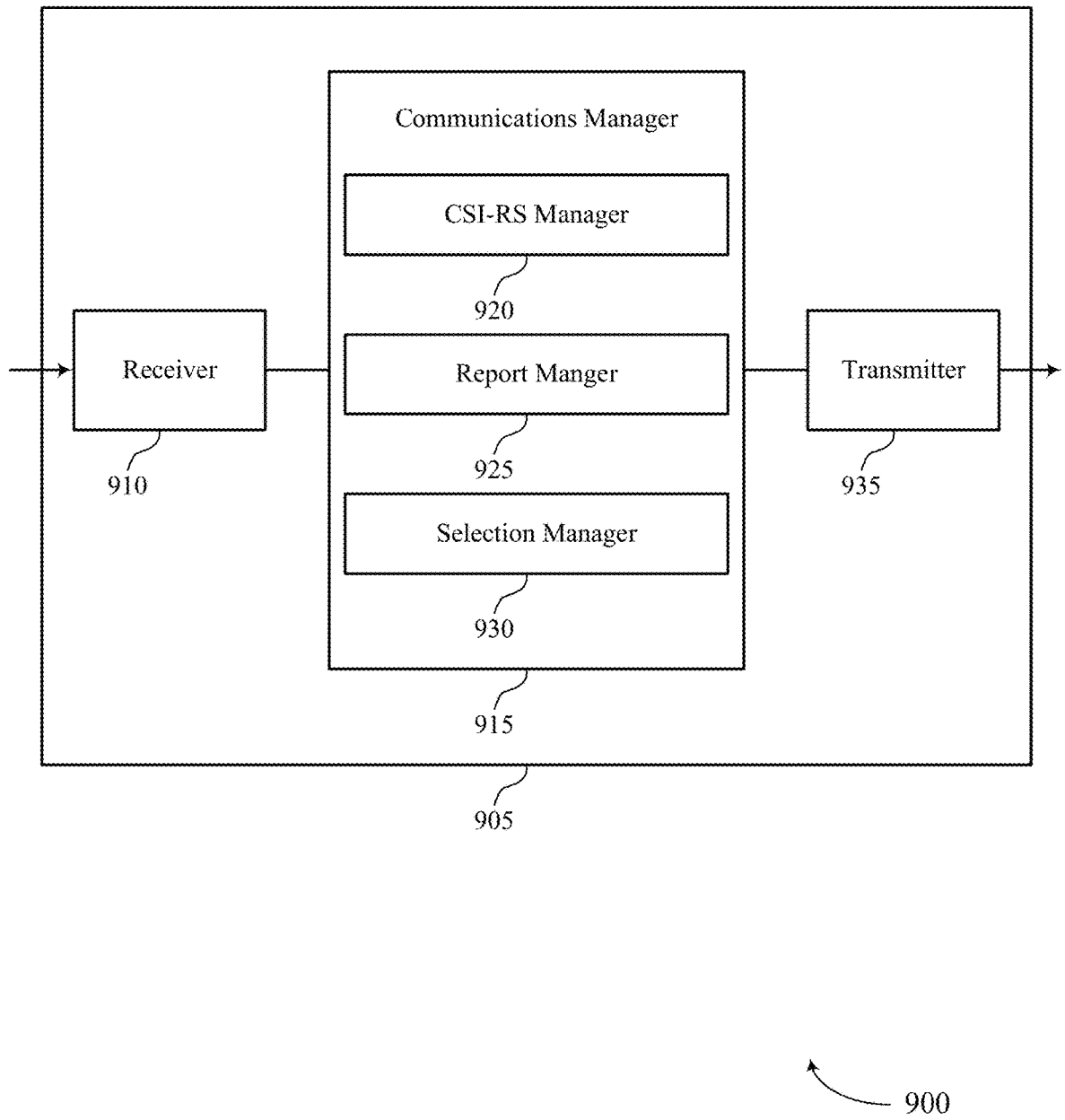

FIG. 9 shows a diagram 900 of a device 905 that supports reporting channel statistics for beam management in accordance with aspects of the present disclosure. The device 905 may be an example of aspects of a device 805, or a base station 105 as described herein. The device 905 may include a receiver 910, a communications manager 915, and a transmitter 935. The device 905 may also include a processor. Each of these components may be in communication with one another (e.g., via one or more buses).

The receiver 910 may receive information such as packets, user data, or control information associated with various information channels (e.g., control channels, data channels, and information related to reporting channel statistics for beam management, etc.). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include a CSI-RS manager 920, a report manager 925, and a selection manager 930. The communications manager 915 may be an example of aspects of the communications manager 1110 described herein.

The CSI-RS manager 920 may transmit, to a UE, one or more reference signals for a beam management procedure, the one or more reference signals being associated with a first channel. The report manager 925 may receive, from the UE, a report including at least an indication of a received power associated with the one or more reference signals and a set of channel statistics associated with the first channel based on the beam management procedure. The selection manager 930 may select one or both of a beam and a second channel for communication with the UE based on the indication of the received power and the set of channel statistics.

The transmitter 935 may transmit signals generated by other components of the device 905. In some examples, the transmitter 935 may be collocated with a receiver 910 in a transceiver module. For example, the transmitter 935 may be an example of aspects of the transceiver 1120 described with reference to FIG. 11. The transmitter 935 may utilize a single antenna or a set of antennas.

Figure 10:
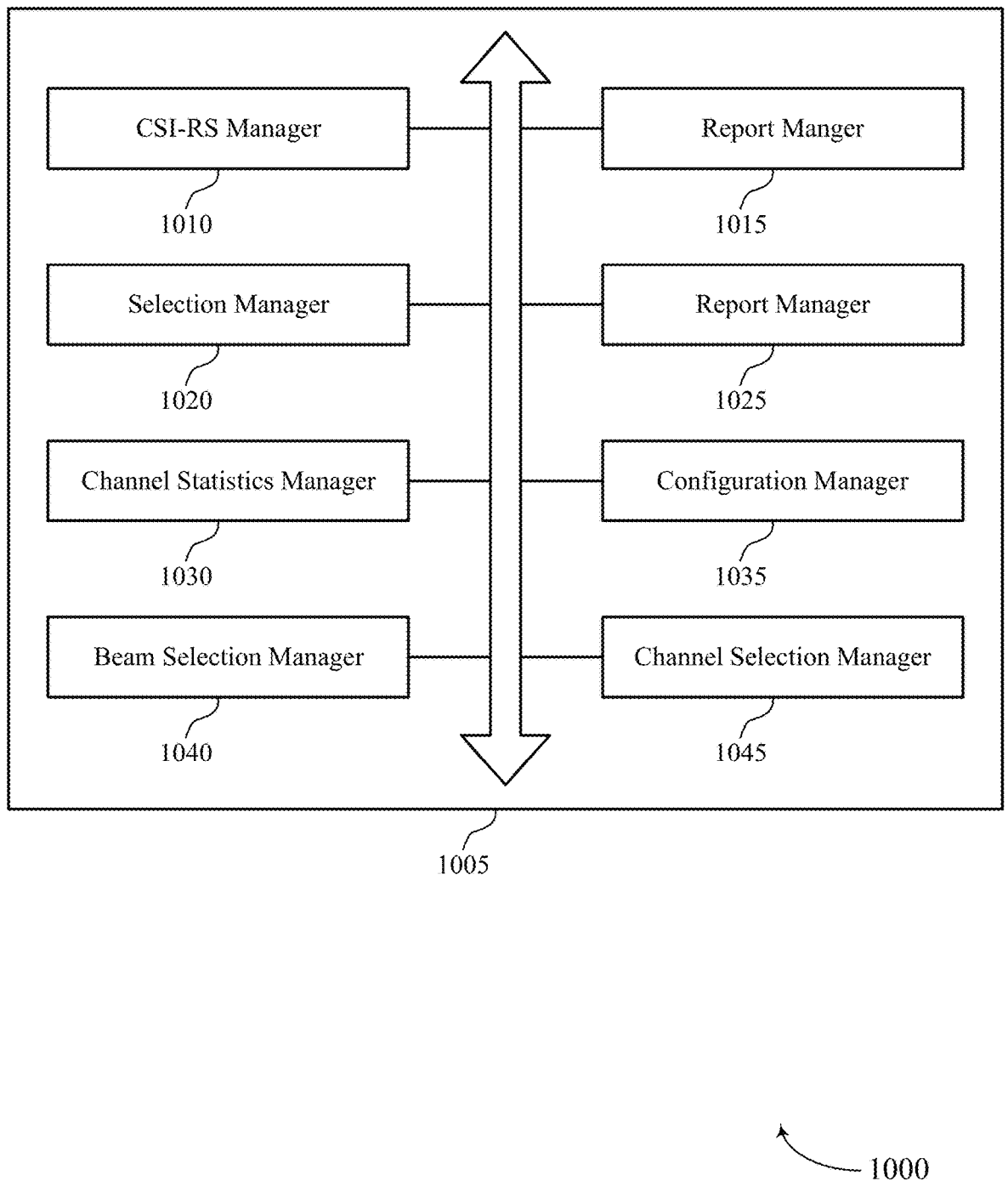
FIG. 10 shows a diagram of a communications manager that supports reporting channel statistics for beam management in accordance with aspects of the present disclosure.

FIG. 10 shows a diagram 1000 of a communications manager 1005 that supports reporting channel statistics for beam management in accordance with aspects of the present disclosure. The communications manager 1005 may be an example of aspects of a communications manager 815, a communications manager 915, or a communications manager 1110 described herein. The communications manager 1005 may include a CSI-RS manager 1010, a report manager 1015, a selection manager 1020, a report manager 1025, a channel statistics manager 1030, a configuration manager 1035, a beam selection manager 1040, and a channel selection manager 1045. Each of these modules may communicate, directly or indirectly, with one another (e.g., via one or more buses).

The CSI-RS manager 1010 may transmit, to a UE, one or more reference signals for a beam management procedure, the one or more reference signals being associated with a first channel.

The report manager 1015 may receive, from the UE, a report including at least an indication of a received power associated with the one or more reference signals and a set of channel statistics associated with the first channel based on the beam management procedure.

The selection manager 1020 may select one or both of a beam and a second channel for communication with the UE based on the indication of the received power and the set of channel statistics.

The report manager 1025 may receive a first indication of the received power in a first field of the report and a second indication of the set of channel statistics in a second field of the report. In some examples, the report manager 1025 may receive the report including a parameter that is based on a combination of the received power and the set of channel statistics. In some cases, the parameter includes a difference from the indication of the received power based on the combination.

The channel statistics manager 1030 may identify the channel statistics determined by the UE. In some cases, the set of channel statistics includes a frequency selectivity associated with the first channel. In some cases, the set of channel statistics includes a time selectivity associated with the first channel. In some cases, the set of channel statistics includes one or both of a frequency correlation and a time correlation associated with the first channel.

The configuration manager 1035 may transmit, to the UE, an indication of a configuration, where the report including at least the indication of the received power and the set of channel statistics is based on the configuration.

The beam selection manager 1040 may transmit, to the UE, an indication of the selected beam. In some examples, the beam selection manager 1040 may communicate with the UE using the selected beam.

The channel selection manager 1045 may transmit, to the UE, an indication of the selected second channel. In some examples, the channel selection manager 1045 may communicate with the UE using the selected second channel.

Figure 11:
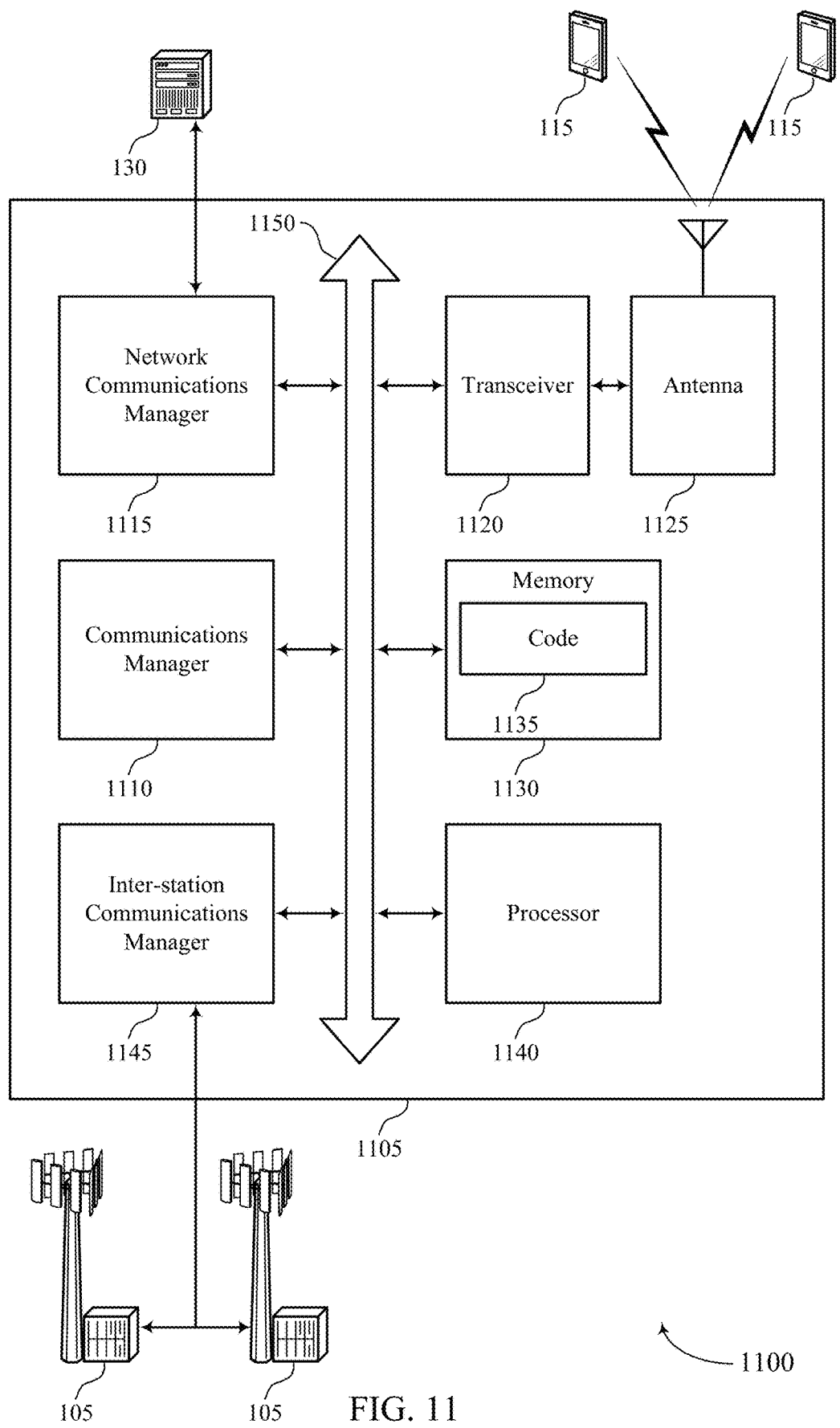
FIG. 11 shows a diagram of a system including a device that supports reporting channel statistics for beam management in accordance with aspects of the present disclosure.

FIG. 11 shows a diagram of a system 1100 including a device 1105 that supports reporting channel statistics for beam management in accordance with aspects of the present disclosure. The device 1105 may be an example of or include the components of device 805, device 905, or a base station 105 as described herein. The device 1105 may include components for bi-directional voice and data communications including components for transmitting and receiving communications, including a communications manager 1110, a network communications manager 1115, a transceiver 1120, an antenna 1125, memory 1130, a processor 1140, and an inter-station communications manager 1145. These components may be in electronic communication via one or more buses (e.g., bus 1150).

The communications manager 1110 may transmit, to a UE, one or more reference signals for a beam management procedure, the one or more reference signals being associated with a first channel, receive, from the UE, a report including at least an indication of a received power associated with the one or more reference signals and a set of channel statistics associated with the first channel based on the beam management procedure, and select one or both of a beam and a second channel for communication with the UE based on the indication of the received power and the set of channel statistics.

The network communications manager 1115 may manage communications with the core network (e.g., via one or more wired backhaul links). For example, the network communications manager 1115 may manage the transfer of data communications for client devices, such as one or more UEs 115.

The transceiver 1120 may communicate bi-directionally, via one or more antennas, wired, or wireless links as described herein. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include RAM, ROM, or a combination thereof. The memory 1130 may store computer-readable code 1135 including instructions that, when executed by a processor (e.g., the processor 1140) cause the device to perform various functions described herein. In some cases, the memory 1130 may contain, among other things, a BIOS which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some cases, a memory controller may be integrated into processor 1140. The processor 1140 may be configured to execute computer-readable instructions stored in a memory (e.g., the memory 1130) to cause the device 1105 to perform various functions (e.g., functions or tasks supporting reporting channel statistics for beam management).

The inter-station communications manager 1145 may manage communications with other base station 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communication network technology to provide communication between base stations 105.

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
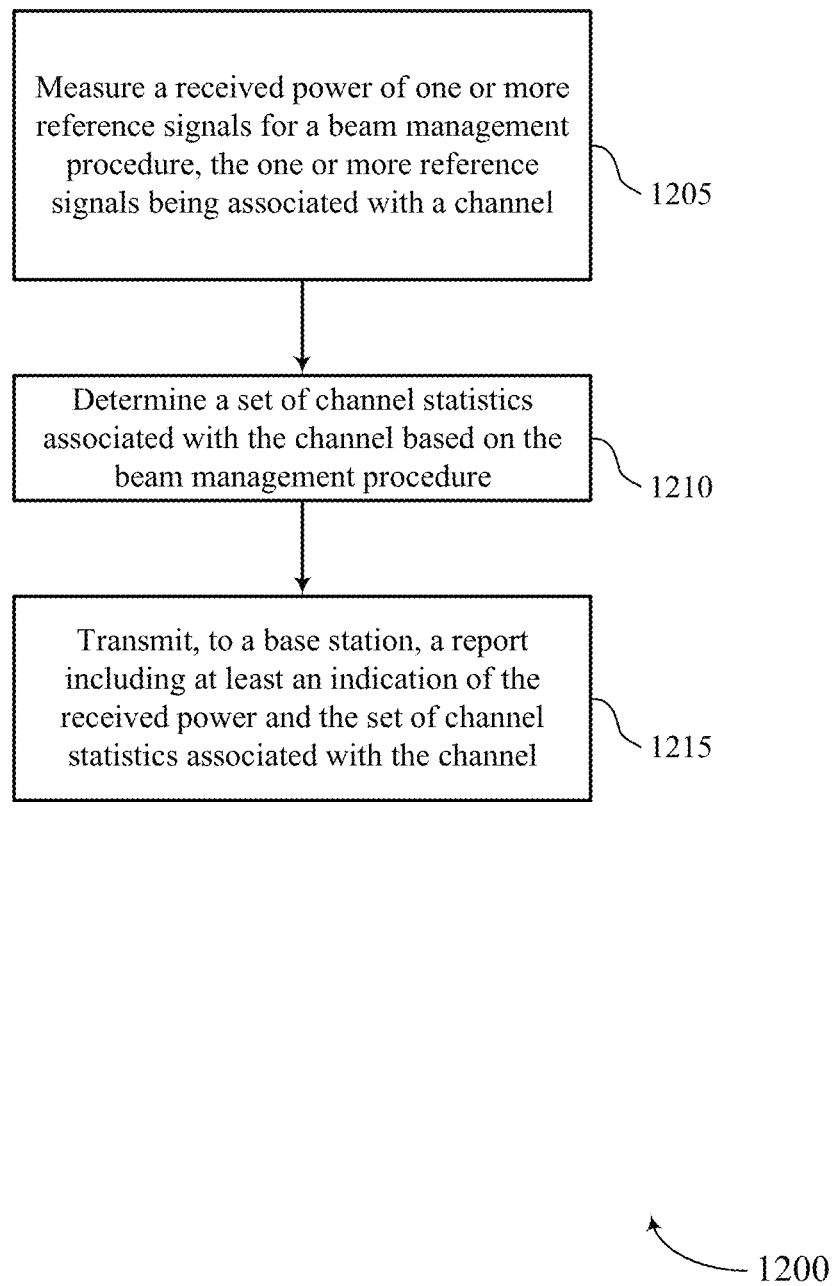
FIGS. 12 through 17 show flowcharts illustrating methods that support reporting channel statistics for beam management in accordance with aspects of the present disclosure.

FIG. 12 shows a flowchart illustrating a method 1200 that supports reporting channel statistics for beam management in accordance with aspects of the present disclosure. The operations of method 1200 may be implemented by a UE 115 or its components as described herein. For example, the operations of method 1200 may be performed by a communications manager as described with reference to FIGS. 4 through 7. In some examples, a UE may execute a set of instructions to control the functional elements of the UE to perform the functions described herein. Additionally or alternatively, a UE may perform aspects of the functions described herein using special-purpose hardware.

At 1205, the UE may measure a received power of one or more reference signals for a beam management procedure, the one or more reference signals being associated with a channel. The operations of 1205 may be performed according to the methods described herein. In some examples, aspects of the operations of 1205 may be performed by an RSRP manager as described with reference to FIGS. 4 through 7.

At 1210, the UE may determine a set of channel statistics associated with the channel based on the beam management procedure. The operations of 1210 may be performed according to the methods described herein. In some examples, aspects of the operations of 1210 may be performed by a channel statistics manager as described with reference to FIGS. 4 through 7.

At 1215, the UE may transmit, to a base station, a report including at least an indication of the received power and the set of channel statistics associated with the channel. The operations of 1215 may be performed according to the methods described herein. In some examples, aspects of the operations of 1215 may be performed by a report manager as described with reference to FIGS. 4 through 7.

Figure 13:
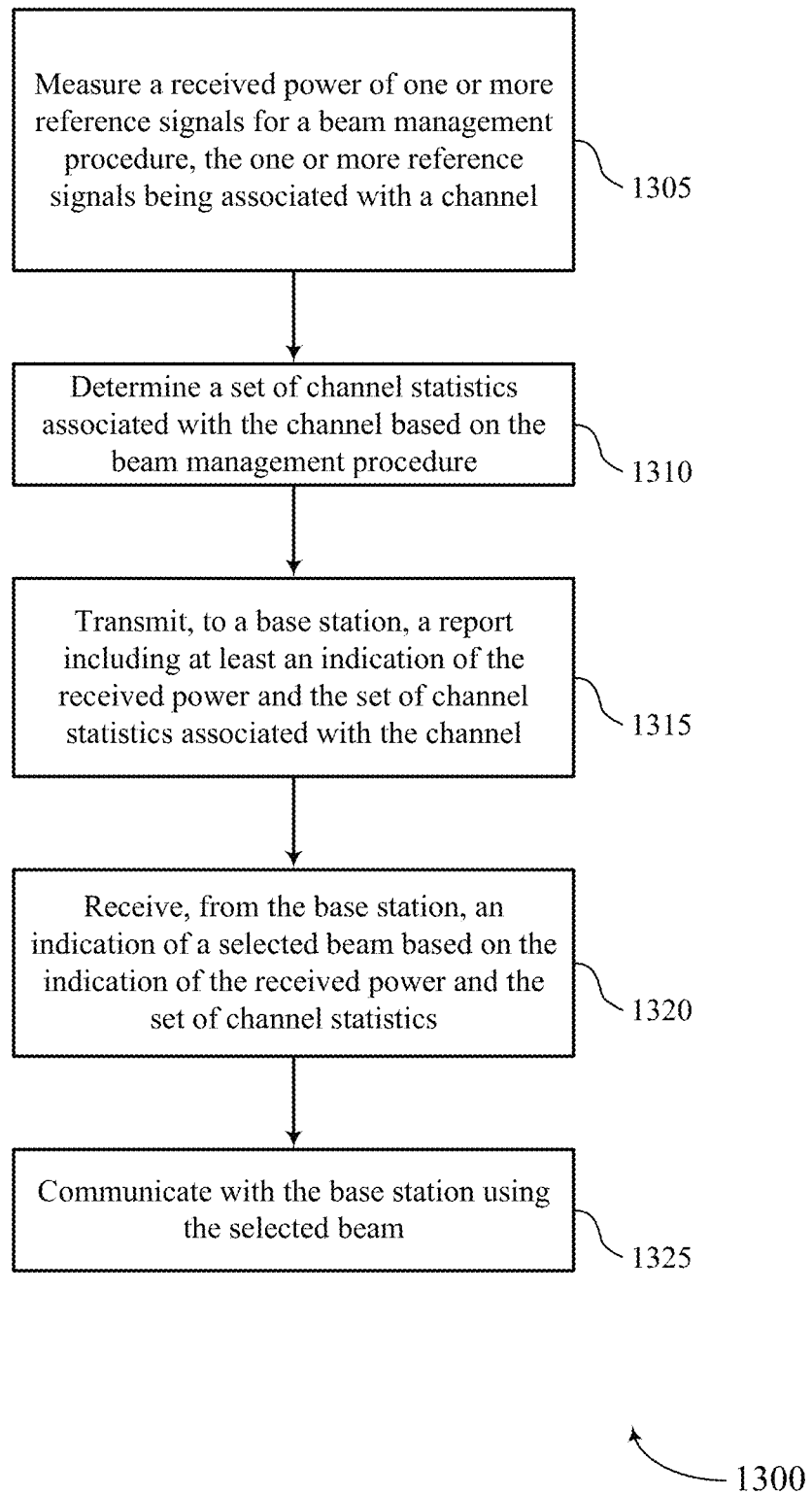

FIG. 13 shows a flowchart illustrating a method 1300 that supports reporting channel statistics for beam management in accordance with aspects of the present disclosure. The operations of method 1300 may be implemented by a UE 115 or its components as described herein. For example, the operations of method 1300 may be performed by a communications manager as described with reference to FIGS. 4 through 7. In some examples, a UE may execute a set of instructions to control the functional elements of the UE to perform the functions described herein. Additionally or alternatively, a UE may perform aspects of the functions described herein using special-purpose hardware.

At 1305, the UE may measure a received power of one or more reference signals for a beam management procedure, the one or more reference signals being associated with a channel. The operations of 1305 may be performed according to the methods described herein. In some examples, aspects of the operations of 1305 may be performed by an RSRP manager as described with reference to FIGS. 4 through 7.

At 1310, the UE may determine a set of channel statistics associated with the channel based on the beam management procedure. The operations of 1310 may be performed according to the methods described herein. In some examples, aspects of the operations of 1310 may be performed by a channel statistics manager as described with reference to FIGS. 4 through 7.

At 1315, the UE may transmit, to a base station, a report including at least an indication of the received power and the set of channel statistics associated with the channel. The operations of 1315 may be performed according to the methods described herein. In some examples, aspects of the operations of 1315 may be performed by a report manager as described with reference to FIGS. 4 through 7.

At 1320, the UE may receive, from the base station, an indication of a selected beam based on the indication of the received power and the set of channel statistics. The operations of 1320 may be performed according to the methods described herein. In some examples, aspects of the operations of 1320 may be performed by a beam selection manager as described with reference to FIGS. 4 through 7.

At 1325, the UE may communicate with the base station using the selected beam. The operations of 1325 may be performed according to the methods described herein. In some examples, aspects of the operations of 1325 may be performed by a beam selection manager as described with reference to FIGS. 4 through 7.

Figure 14:
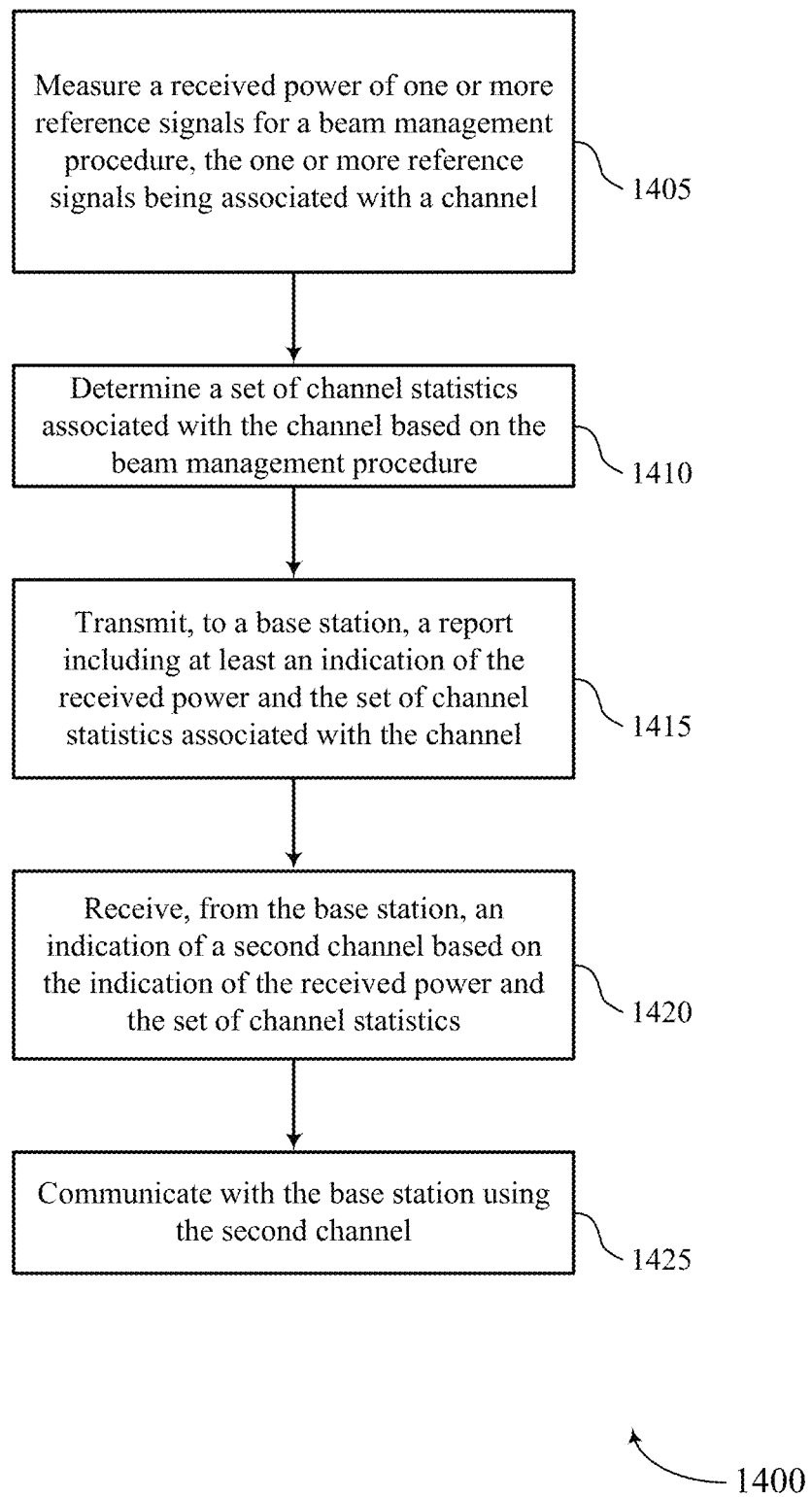

FIG. 14 shows a flowchart illustrating a method 1400 that supports reporting channel statistics for beam management in accordance with aspects of the present disclosure. The operations of method 1400 may be implemented by a UE 115 or its components as described herein. For example, the operations of method 1400 may be performed by a communications manager as described with reference to FIGS. 4 through 7. In some examples, a UE may execute a set of instructions to control the functional elements of the UE to perform the functions described herein. Additionally or alternatively, a UE may perform aspects of the functions described herein using special-purpose hardware.

At 1405, the UE may measure a received power of one or more reference signals for a beam management procedure, the one or more reference signals being associated with a channel. The operations of 1405 may be performed according to the methods described herein. In some examples, aspects of the operations of 1405 may be performed by an RSRP manager as described with reference to FIGS. 4 through 7.

At 1410, the UE may determine a set of channel statistics associated with the channel based on the beam management procedure. The operations of 1410 may be performed according to the methods described herein. In some examples, aspects of the operations of 1410 may be performed by a channel statistics manager as described with reference to FIGS. 4 through 7.

At 1415, the UE may transmit, to a base station, a report including at least an indication of the received power and the set of channel statistics associated with the channel. The operations of 1415 may be performed according to the methods described herein. In some examples, aspects of the operations of 1415 may be performed by a report manager as described with reference to FIGS. 4 through 7.

At 1420, the UE may receive, from the base station, an indication of a second channel based on the indication of the received power and the set of channel statistics. The operations of 1420 may be performed according to the methods described herein. In some examples, aspects of the operations of 1420 may be performed by a channel selection manager as described with reference to FIGS. 4 through 7.

At 1425, the UE may communicate with the base station using the second channel. The operations of 1425 may be performed according to the methods described herein. In some examples, aspects of the operations of 1425 may be performed by a channel selection manager as described with reference to FIGS. 4 through 7.

Figure 15:
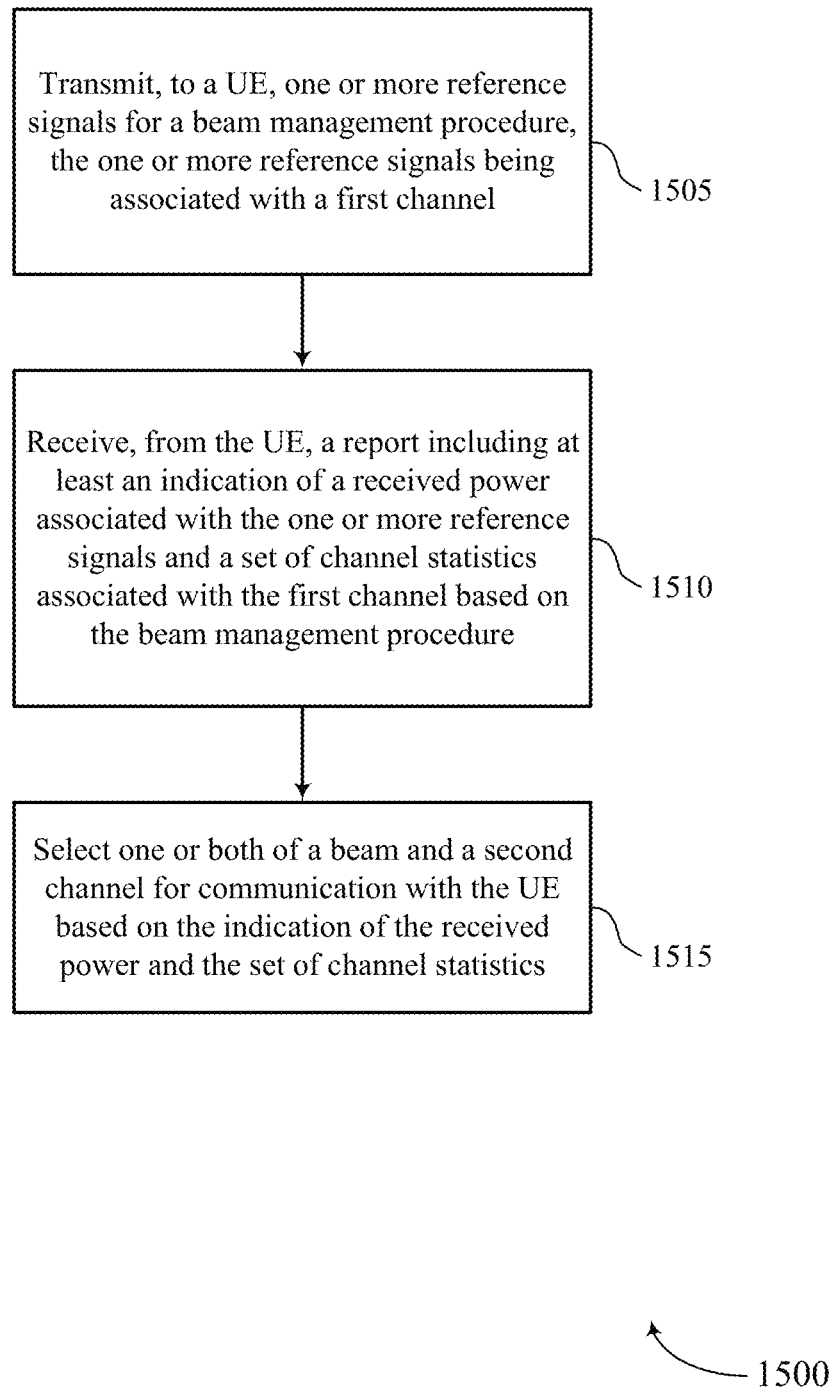

FIG. 15 shows a flowchart illustrating a method 1500 that supports reporting channel statistics for beam management in accordance with aspects of the present disclosure. The operations of method 1500 may be implemented by a base station 105 or its components as described herein. For example, the operations of method 1500 may be performed by a communications manager as described with reference to FIGS. 8 through 11. In some examples, a base station may execute a set of instructions to control the functional elements of the base station to perform the functions described herein. Additionally or alternatively, a base station may perform aspects of the functions described herein using special-purpose hardware.

At 1505, the base station may transmit, to a UE, one or more reference signals for a beam management procedure, the one or more reference signals being associated with a first channel. The operations of 1505 may be performed according to the methods described herein. In some examples, aspects of the operations of 1505 may be performed by a CSI-RS manager as described with reference to FIGS. 8 through 11.

At 1510, the base station may receive, from the UE, a report including at least an indication of a received power associated with the one or more reference signals and a set of channel statistics associated with the first channel based on the beam management procedure. The operations of 1510 may be performed according to the methods described herein. In some examples, aspects of the operations of 1510 may be performed by a report manager as described with reference to FIGS. 8 through 11.

At 1515, the base station may select one or both of a beam and a second channel for communication with the UE based on the indication of the received power and the set of channel statistics. The operations of 1515 may be performed according to the methods described herein. In some examples, aspects of the operations of 1515 may be performed by a selection manager as described with reference to FIGS. 8 through 11.

Figure 16:
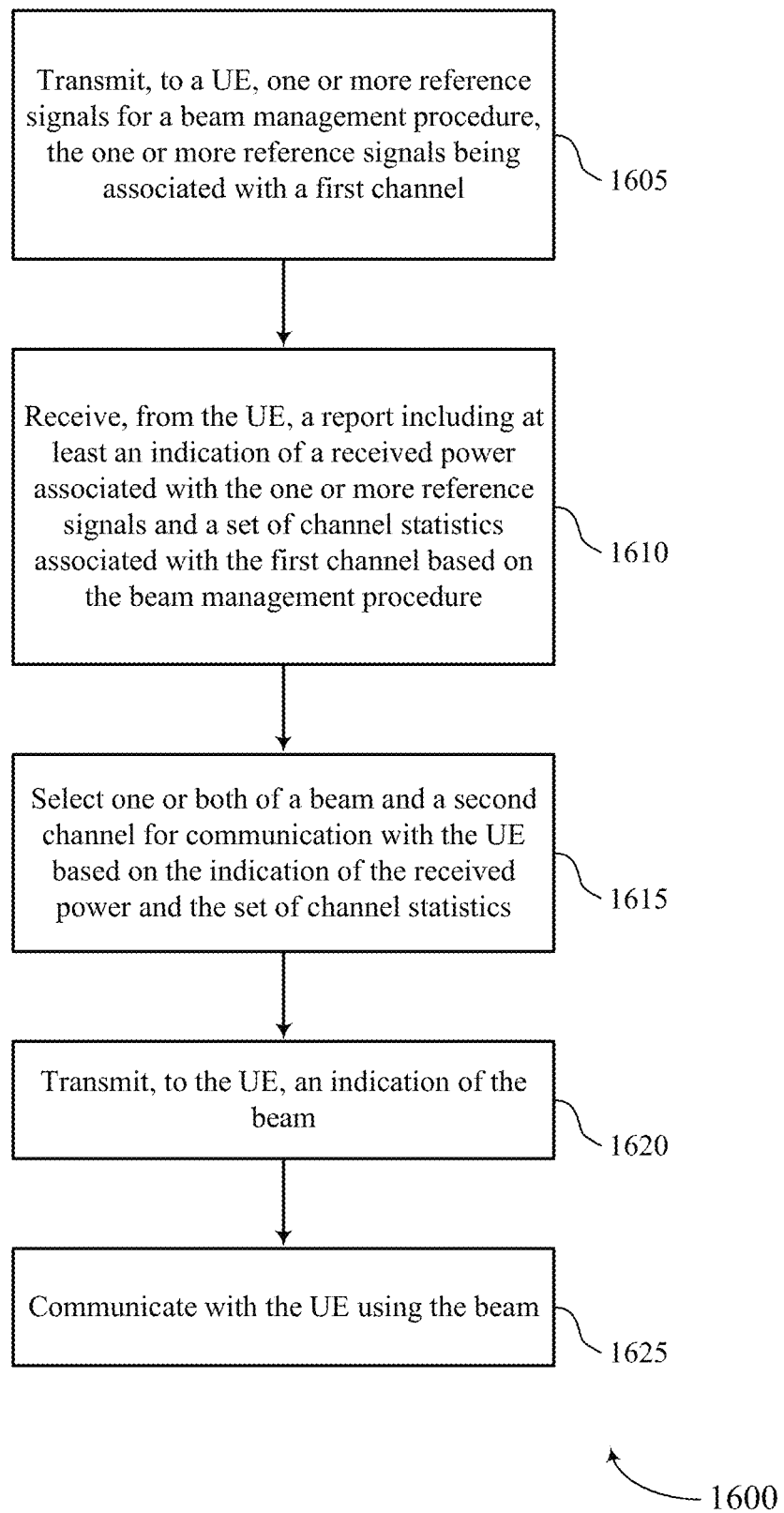

FIG. 16 shows a flowchart illustrating a method 1600 that supports reporting channel statistics for beam management in accordance with aspects of the present disclosure. The operations of method 1600 may be implemented by a base station 105 or its components as described herein. For example, the operations of method 1600 may be performed by a communications manager as described with reference to FIGS. 8 through 11. In some examples, a base station may execute a set of instructions to control the functional elements of the base station to perform the functions described herein. Additionally or alternatively, a base station may perform aspects of the functions described herein using special-purpose hardware.

At 1605, the base station may transmit, to a UE, one or more reference signals for a beam management procedure, the one or more reference signals being associated with a first channel. The operations of 1605 may be performed according to the methods described herein. In some examples, aspects of the operations of 1605 may be performed by a CSI-RS manager as described with reference to FIGS. 8 through 11.

At 1610, the base station may receive, from the UE, a report including at least an indication of a received power associated with the one or more reference signals and a set of channel statistics associated with the first channel based on the beam management procedure. The operations of 1610 may be performed according to the methods described herein. In some examples, aspects of the operations of 1610 may be performed by a report manager as described with reference to FIGS. 8 through 11.

At 1615, the base station may select one or both of a beam and a second channel for communication with the UE based on the indication of the received power and the set of channel statistics. The operations of 1615 may be performed according to the methods described herein. In some examples, aspects of the operations of 1615 may be performed by a selection manager as described with reference to FIGS. 8 through 11.

At 1620, the base station may transmit, to the UE, an indication of the beam. The operations of 1620 may be performed according to the methods described herein. In some examples, aspects of the operations of 1620 may be performed by a beam selection manager as described with reference to FIGS. 8 through 11.

At 1625, the base station may communicate with the UE using the beam. The operations of 1625 may be performed according to the methods described herein. In some examples, aspects of the operations of 1625 may be performed by a beam selection manager as described with reference to FIGS. 8 through 11.

Figure 17:
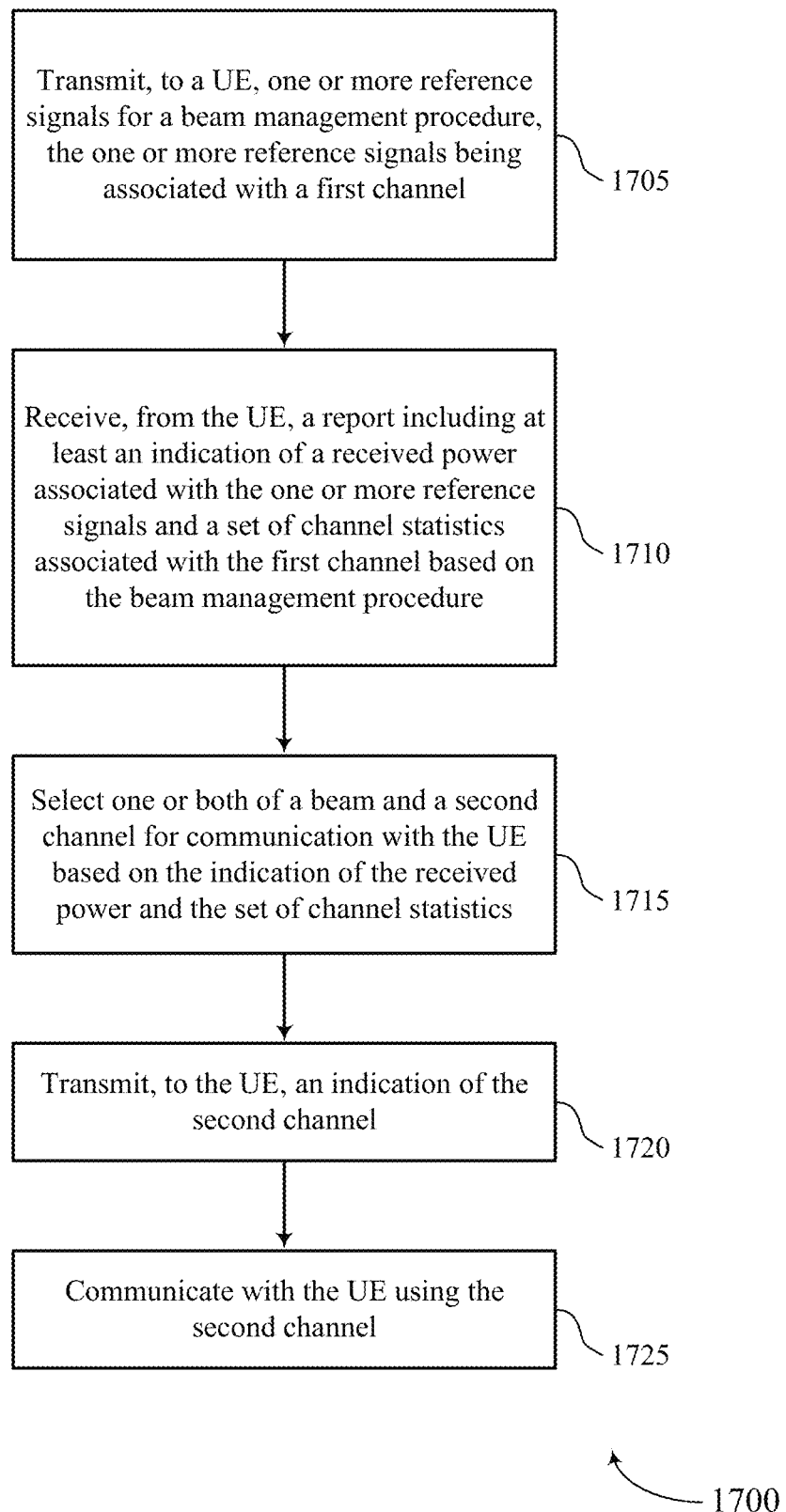

FIG. 17 shows a flowchart illustrating a method 1700 that supports reporting channel statistics for beam management in accordance with aspects of the present disclosure. The operations of method 1700 may be implemented by a base station 105 or its components as described herein. For example, the operations of method 1700 may be performed by a communications manager as described with reference to FIGS. 8 through 11. In some examples, a base station may execute a set of instructions to control the functional elements of the base station to perform the functions described herein. Additionally or alternatively, a base station may perform aspects of the functions described herein using special-purpose hardware.

At 1705, the base station may transmit, to a UE, one or more reference signals for a beam management procedure, the one or more reference signals being associated with a first channel. The operations of 1705 may be performed according to the methods described herein. In some examples, aspects of the operations of 1705 may be performed by a CSI-RS manager as described with reference to FIGS. 8 through 11.

At 1710, the base station may receive, from the UE, a report including at least an indication of a received power associated with the one or more reference signals and a set of channel statistics associated with the first channel based on the beam management procedure. The operations of 1710 may be performed according to the methods described herein. In some examples, aspects of the operations of 1710 may be performed by a report manager as described with reference to FIGS. 8 through 11.

At 1715, the base station may select one or both of a beam and a second channel for communication with the UE based on the indication of the received power and the set of channel statistics. The operations of 1715 may be performed according to the methods described herein. In some examples, aspects of the operations of 1715 may be performed by a selection manager as described with reference to FIGS. 8 through 11.

At 1720, the base station may transmit, to the UE, an indication of the second channel. The operations of 1720 may be performed according to the methods described herein. In some examples, aspects of the operations of 1720 may be performed by a channel selection manager as described with reference to FIGS. 8 through 11.

At 1725, the base station may communicate with the UE using the second channel. The operations of 1725 may be performed according to the methods described herein. In some examples, aspects of the operations of 1725 may be performed by a channel selection manager as described with reference to FIGS. 8 through 11.

The following provides an overview of aspects of the present disclosure:

Aspect 1: A method for wireless communication at a UE, comprising: measuring a received power of one or more reference signals for a beam management procedure, the one or more reference signals being associated with a channel; determining a set of channel statistics associated with the channel based at least in part on the beam management procedure; and transmitting, to a base station, a report comprising at least an indication of the received power and the set of channel statistics associated with the channel.

Aspect 2: The method of aspect 1, wherein transmitting the report comprises: transmitting a first indication of the received power in a first field of the report and a second indication of the set of channel statistics in a second field of the report.

Aspect 3: The method of aspect 1, wherein transmitting the report comprises: determining a parameter that is based at least in part on a combination of the received power and the set of channel statistics; and transmitting the report comprising the parameter.

Aspect 4: The method of aspect 3, wherein the parameter comprises a difference from the received power based at least in part on the combination.

Aspect 5: The method of any of aspects 1 through 4, further comprising: determining a frequency selectivity associated with the channel, wherein the set of channel statistics comprises the frequency selectivity.

Aspect 6: The method of any of aspects 1 through 5, further comprising: determining a time selectivity associated with the channel, wherein the set of channel statistics comprises the time selectivity.

Aspect 7: The method of any of aspects 1 through 6, further comprising: determining one or both of a frequency correlation and a time correlation associated with the channel, wherein the set of channel statistics comprises one or both of the frequency correlation and the time correlation.

Aspect 8: The method of any of aspects 1 through 7, further comprising: identifying a configuration for transmitting the report comprising at least the indication of the received power and the set of channel statistics, wherein determining the set of channel statistics is based at least in part on the configuration.

Aspect 9: The method of aspect 8, wherein the configuration is based at least in part on a capability of the UE.

Aspect 10: The method of any of aspects 8 through 9, further comprising: receiving an indication of the configuration from the base station.

Aspect 11: The method of any of aspects 8 through 9, wherein the configuration comprises a pre-configuration of the UE.

Aspect 12: The method of any of aspects 1 through 11, further comprising: performing a channel equalization procedure based at least in part on the set of channel statistics.

Aspect 13: The method of any of aspects 1 through 12, further comprising: receiving, from the base station, an indication of a selected beam based at least in part on the indication of the received power and the set of channel statistics; and communicating with the base station using the selected beam.

Aspect 14: The method of any of aspects 1 through 13, further comprising: receiving, from the base station, an indication of a second channel based at least in part on the indication of the received power and the set of channel statistics; and communicating with the base station using the second channel.

Aspect 15: The method of any of aspects 1 through 14, wherein the report comprises a number of bits based at least in part on the received power and the set of channel statistics.

Aspect 16: A method for wireless communication at a base station, comprising: transmitting, to a UE, one or more reference signals for a beam management procedure, the one or more reference signals being associated with a first channel; receiving, from the UE, a report comprising at least an indication of a received power associated with the one or more reference signals and a set of channel statistics associated with the first channel based at least in part on the beam management procedure; and selecting one or both of a beam and a second channel for communication with the UE based at least in part on the indication of the received power and the set of channel statistics.

Aspect 17: The method of aspect 16, wherein receiving the report comprises: receiving a first indication of the received power in a first field of the report and a second indication of the set of channel statistics in a second field of the report.

Aspect 18: The method of aspect 16, wherein receiving the report comprises: receiving the report comprising a parameter that is based at least in part on a combination of the received power and the set of channel statistics.

Aspect 19: The method of aspect 18, wherein the parameter comprises a difference from the indication of the received power based at least in part on the combination.

Aspect 20: The method of any of aspects 16 through 19, wherein the set of channel statistics comprises a frequency selectivity associated with the first channel.

Aspect 21: The method of any of aspects 16 through 20, wherein the set of channel statistics comprises a time selectivity associated with the first channel.

Aspect 22: The method of any of aspects 16 through 21, wherein the set of channel statistics comprises one or both of a frequency correlation and a time correlation associated with the first channel.

Aspect 23: The method of any of aspects 16 through 22, further comprising: transmitting, to the UE, an indication of a configuration, wherein the report comprising at least the indication of the received power and the set of channel statistics is based at least in part on the configuration.

Aspect 24: The method of any of aspects 16 through 23, further comprising: transmitting, to the UE, an indication of the beam; and communicating with the UE using the beam.

Aspect 25: The method of any of aspects 16 through 24, further comprising: transmitting, to the UE, an indication of the second channel; and communicating with the UE using the second channel.

Aspect 26: An apparatus for wireless communication at a UE, comprising a processor; memory coupled with the processor; and instructions stored in the memory and executable by the processor to cause the apparatus to perform a method of any of aspects 1 through 15.

Aspect 27: An apparatus for wireless communication at a UE, comprising at least one means for performing a method of any of aspects 1 through 15.

Aspect 28: A non-transitory computer-readable medium storing code for wireless communication at a UE, the code comprising instructions executable by a processor to perform a method of any of aspects 1 through 15.

Aspect 29: An apparatus for wireless communication at a base station, comprising a processor; memory coupled with the processor; and instructions stored in the memory and executable by the processor to cause the apparatus to perform a method of any of aspects 16 through 25.

Aspect 30: An apparatus for wireless communication at a base station, comprising at least one means for performing a method of any of aspects 16 through 25.

Aspect 31: A non-transitory computer-readable medium storing code for wireless communication at a base station, the code comprising instructions executable by a processor to perform a method of any of aspects 16 through 25.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone;

B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communication performed by a user equipment (UE), comprising:
   a memory; and
   at least one processor coupled with the memory, wherein the at least one processor is configured to:
   measure a received power of one or more reference signals for a beam management procedure, the one or more reference signals being associated with a channel;
   and
   transmit, to a network device, a report comprising at least an indication of the received power and a set of channel statistics associated with the channel, wherein the set of channel statistics is based at least in part on the beam management procedure, and the indication of the received power and the set of channel statistics is based at least in part on a summation of the received power and the set of channel statistics.

2. The apparatus of claim 1, wherein, to transmit the report, the at least one processor is configured to:
   transmit a first indication of the received power in a first field of the report and a second indication of the set of channel statistics in a second field of the report.

3. The apparatus of claim 1, wherein, to transmit the report, the at least one processor is configured to:
   determine a parameter that is based at least in part on the summation of the received power and the set of channel statistics; and
   transmit the report comprising the parameter.

4. The apparatus of claim 3, wherein the parameter comprises a difference from the received power based at least in part on the summation of the received power and the set of channel statistics.

5. The apparatus of claim 1, wherein the at least one processor is further configured to:
   determine a frequency selectivity associated with the channel, wherein the set of channel statistics comprises the frequency selectivity.

6. The apparatus of claim 1, wherein the at least one processor is further configured to:
   determine a time selectivity associated with the channel, wherein the set of channel statistics comprises the time selectivity.

7. The apparatus of claim 1, wherein the at least one processor is further configured to:
   determine one or both of a frequency correlation and a time correlation associated with the channel, wherein the set of channel statistics comprises one or both of the frequency correlation and the time correlation.

8. The apparatus of claim 1, wherein the at least one processor is further configured to:
   identify a configuration for transmitting the report comprising at least the indication of the received power and the set of channel statistics, wherein determining the set of channel statistics is based at least in part on the configuration.

9. The apparatus of claim 8, wherein the configuration is based at least in part on a capability of the UE.

10. The apparatus of claim 8, wherein the at least one processor is further configured to:
    receive an indication of the configuration from the network device.

11. The apparatus of claim 8, wherein the configuration comprises a pre-configuration of the UE.

12. The apparatus of claim 1, wherein the at least one processor is further configured to:
    perform a channel equalization procedure based at least in part on the set of channel statistics.

13. The apparatus of claim 1, wherein the at least one processor is further configured to:
    receive, from the network device, an indication of a selected beam based at least in part on the indication of the received power and the set of channel statistics; and
    communicate with the network device using the selected beam.

14. The apparatus of claim 1, wherein the at least one processor is further configured to:
    receive, from the network device, an indication of a second channel based at least in part on the indication of the received power and the set of channel statistics; and
    communicate with the network device using the second channel.

15. The apparatus of claim 1, wherein the report comprises a number of bits based at least in part on the received power and the set of channel statistics.

16. An apparatus for wireless communication performed by a network device, comprising:
    a memory; and
    at least one processor coupled with the memory, wherein the at least one processor is configured to:

transmit, to a user equipment (UE), one or more reference signals for a beam management procedure, the one or more reference signals being associated with a first channel;

receive, from the UE, a report comprising at least an indication of a received power associated with the one or more reference signals and a set of channel statistics associated with the first channel based at least in part on the beam management procedure, wherein the report is based at least in part on a summation of the received power and the set of channel statistics; and selecting one or both of a beam and a second channel for communication with the UE based at least in part on the indication of the received power and the set of channel statistics.

17. The apparatus of claim 16, wherein, to receive the report, the at least one processor is configured to:

receive a first indication of the received power in a first field of the report and a second indication of the set of channel statistics in a second field of the report.

18. The apparatus of claim 16, wherein, to receive the report, the at least one processor is configured to:

receive the report comprising a parameter that is based at least in part on the summation of the received power and the set of channel statistics.

19. The apparatus of claim 18, wherein the parameter comprises a difference from the indication of the received power based at least in part on the summation of the received power and the set of channel statistics.

20. The apparatus of claim 16, wherein the set of channel statistics comprises a frequency selectivity associated with the first channel.

21. The apparatus of claim 16, wherein the set of channel statistics comprises a time selectivity associated with the first channel.

22. The apparatus of claim 16, wherein the set of channel statistics comprises one or both of a frequency correlation and a time correlation associated with the first channel.

23. The apparatus of claim 16, wherein the at least one processor is further configured to:

transmit, to the UE, an indication of a configuration, wherein the report comprising at least the indication of the received power and the set of channel statistics is based at least in part on the configuration.

24. The apparatus of claim 16, wherein the at least one processor is further configured to:

transmit, to the UE, an indication of the beam; and communicate with the UE using the beam.

25. The apparatus of claim 16, wherein the at least one processor is further configured to:

transmitting, to the UE, an indication of the second channel; and communicating with the UE using the second channel.

26. A method for wireless communication performed by a user equipment (UE), comprising:

measuring a received power of one or more reference signals for a beam management procedure, the one or more reference signals being associated with a channel; and transmitting, to a network device, a report comprising at least an indication of the received power and a set of channel statistics associated with the channel, wherein the set of channel statistics is based at least in part on the beam management procedure, and the indication of the received power and the set of channel statistics is based at least in part on a summation of the received power and the set of channel statistics.

27. The method of claim 26, wherein transmitting the report further comprises:

transmitting a first indication of the received power in a first field of the report and a second indication of the set of channel statistics in a second field of the report.

28. The method of claim 26, wherein transmitting the report further comprises:

determining a parameter that is based at least in part on the summation of the received power and the set of channel statistics; and transmitting the report comprising the parameter.

29. A method for wireless communication performed by a network device, comprising:

transmitting, to a user equipment (UE), one or more reference signals for a beam management procedure, the one or more reference signals being associated with a first channel;

receiving, from the UE, a report comprising at least an indication of a received power associated with the one or more reference signals and a set of channel statistics associated with the first channel based at least in part on the beam management procedure, wherein the report is based at least in part on a summation of the received power and the set of channel statistics; and selecting one or both of a beam and a second channel for communication with the UE based at least in part on the indication of the received power and the set of channel statistics.

30. The method of claim 29, wherein receiving the report further comprises:

receiving a first indication of the received power in a first field of the report and a second indication of the set of channel statistics in a second field of the report.

* * * * *